(12) United States Patent
Harada

(10) Patent No.: US 10,115,193 B2
(45) Date of Patent: Oct. 30, 2018

(54) IMAGE PROCESSING DEVICE, IMAGE PROCESSING SYSTEM, IMAGE PROCESSING PROGRAM, AND IMAGE PROCESSING METHOD

(71) Applicant: FUJIFILM CORPORATION, Minato-ku, Tokyo (JP)

(72) Inventor: Daiki Harada, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 126 days.

(21) Appl. No.: 15/057,132

(22) Filed: Mar. 1, 2016

(65) Prior Publication Data
US 2016/0180524 A1 Jun. 23, 2016

Related U.S. Application Data

(63) Continuation of application No. PCT/JP2014/075532, filed on Sep. 25, 2014.

(30) Foreign Application Priority Data

Sep. 25, 2013 (JP) ................................. 2013-198553
Sep. 25, 2014 (JP) ................................. 2014-195140

(51) Int. Cl.
*G06K 9/00* (2006.01)
*G06T 7/00* (2017.01)
*G06T 5/00* (2006.01)

(52) U.S. Cl.
CPC .............. *G06T 7/0012* (2013.01); *G06T 5/00* (2013.01); *G06T 2207/10116* (2013.01); *G06T 2207/30061* (2013.01)

(58) Field of Classification Search
None
See application file for complete search history.

(56) References Cited

U.S. PATENT DOCUMENTS 5,982,953 A * 11/1999 Yanagita ............... G06F 19/321
                                                    348/580
2006/0222225 A1* 10/2006 Kurahashi ............. G06F 19/321
                                                    382/128

(Continued)

FOREIGN PATENT DOCUMENTS

JP   2004-290329 A   10/2004
JP   2005-301492 A   10/2005
JP   2006-271800 A   10/2006

OTHER PUBLICATIONS

Extended European Search Report dated Jan. 3, 2017, issued in corresponding EP Patent Application No. 14849947.

(Continued)

*Primary Examiner* — Nancy Bitar
(74) *Attorney, Agent, or Firm* — Solaris Intellectual Property Group, PLLC

(57) ABSTRACT

The present invention is capable of reducing a load of a processing operation of a user. Namely, a console first acquires an original image of a radiographic image acquired from a radiographic image capturing device, in order to perform common processing operations. The console detects common processing operations performed on an original image by the user and stores processing content of the common processing operations and the original image in association with each other. In a case in which processing transitions to individual processing (purpose A) for generating a purpose A image, the console performs image analysis process A on the acquired original image and reflects the common processing to generate an image for purpose A. Further, the console detects individual processing operations performed on the image for purpose A by the user, and performs image processing corresponding to the individual processing operations to generate a purpose A image.

14 Claims, 24 Drawing Sheets

RADIOGRAPHIC IMAGE CAPTURING SYSTEM 10

(56) References Cited

U.S. PATENT DOCUMENTS

| | | | | |
|---|---|---|---|---|
| 2008/0025583 A1* | 1/2008 | Jabri | ............... | G06T 5/00 |
| | | | | 382/128 |
| 2010/0246925 A1* | 9/2010 | Nagatsuka | ............... | A61B 5/08 |
| | | | | 382/132 |
| 2012/0098838 A1* | 4/2012 | Lehmann | ............... | G06T 19/00 |
| | | | | 345/501 |
| 2016/0065909 A1* | 3/2016 | Derenne | ............... | A61B 5/0013 |
| | | | | 348/140 |
| 2017/0011281 A1* | 1/2017 | Dijkman | ............... | G06K 9/66 |

OTHER PUBLICATIONS

Japanese Office Action dated Oct. 4, 2016 in corresponding Japanese Patent Application No. 2014-195140 and a Partial English Translation thereof.
International Search Report issued in International Application No. PCT/JP2014/075532 dated Dec. 16, 2014.
Written Opinion of the ISA issued in International Application No. PCT/JP2014/075532 dated Dec. 16, 2014.
Office Action dated Sep. 6, 2017, issued by the EPO in corresponding EP Patent Application No. EP14849947.8.
Summons to attend oral proceedings dated Jul. 5, 2018, issued in corresponding EP Patent Application No. 14849947.8.

* cited by examiner

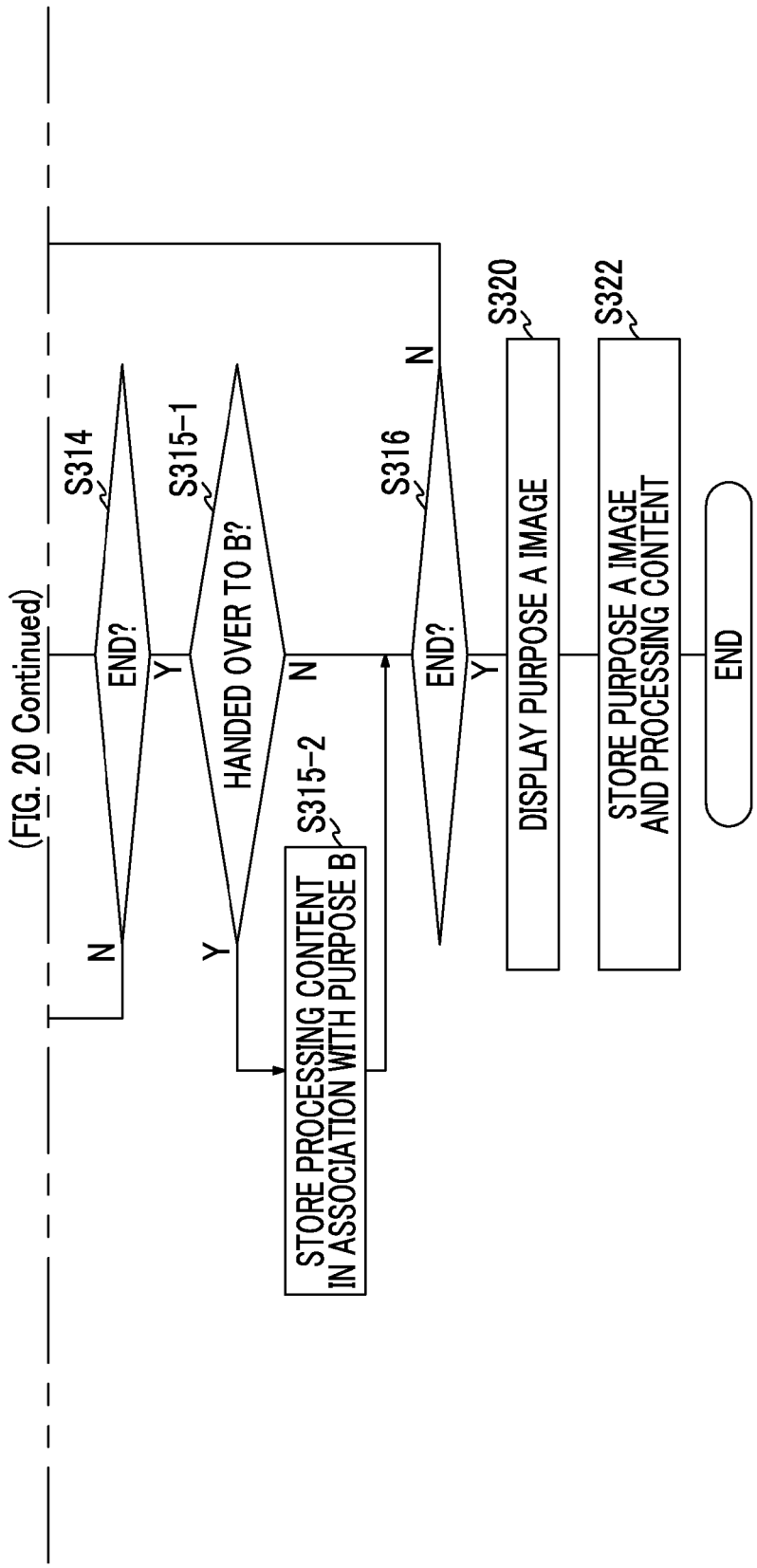

IMAGE PROCESSING DEVICE, IMAGE PROCESSING SYSTEM, IMAGE PROCESSING PROGRAM, AND IMAGE PROCESSING METHOD

CROSS-REFERENCE TO RELATED APPLICATIONS

This application is a continuation application of International Application No. PCT/JP2014/075532, filed on Sep. 25, 2014, which is incorporated herein by reference in its entirety. Further, this application claims priority from Japanese Patent Application No. 2013-198553, filed on Sep. 25, 2013, and Japanese Patent Application No. 2014-195140, filed on Sep. 25, 2014, the disclosures of which are incorporated by reference herein in their entireties.

BACKGROUND

Technical Field

The present invention relates to an image processing device, an image processing system, an image processing program, and an image processing method. Particularly, the present invention relates to an image processing device, an image processing system, an image processing program, and an image processing method that are used for image processing of a radiographic image.

Related Art

In recent years, a radiographic image captured by a radiographic image capturing device is often used for examination, diagnosis, medical examination, or the like, and a load on a user who is a doctor, a technician, or the like who interprets the radiographic image is increasing. Further, the user generally performs image processing on the radiographic image, and an image processing load is increasing.

As technology for reducing a load of image processing, for example, image processing history acquisition technology capable of simply performing image processing again by displaying an image processing operation history is described in JP2005-301492A. Further, for example, technology for improving interpretation efficiency by displaying an image obtained by applying different image processing conditions to a selected image is described in JP2006-271800A.

In recent years, capturing and acquiring plural radiographic images having different purposes for one subject (for example, an imaging portion of the subject) have been performed. In a case in which respective image processing is performed on the plural radiographic images, a load of processing operations performed by a user for performing of the image processing further increases. However, in technologies described in JP2005-301492A and JP2006-271800A, it is difficult for a load of processing operations for the plural radiographic images having different purposes to be reduced.

SUMMARY

The present invention provides an image processing device, an image processing system, an image processing program, and an image processing method capable of reducing a load of a processing operation of a user.

An image processing device of the present invention is an image processing device that generates plural different images subjected to different image processing from an original image which is a radiographic image, the image processing device including: a common image generation unit that receives a common processing operation for the original image and performs common processing corresponding to the received common processing operation on the original image to generate an original image subjected to common processing; a first image generation unit that performs first image processing on the original image subjected to common processing to generate a first image; and a second image generation unit that performs second image processing different from the first image processing on the original image subjected to common processing to generate a second image.

An image processing device of the present invention includes: a generation unit that generates a first image and a second image by performing image analysis processes having different processing conditions on an original image which is a radiographic image; a reception unit that receives one or more common processing operations for the original image; and a reflecting unit that reflects the common processing operations received by the reception unit in the original image before the generation unit performs the image analysis processes having different processing conditions.

Further, the image processing device of the present invention may further include: an image processing unit that receives any one of first image processing for the first image and second image processing for the second image and performs the first received image processing or the second received image processing on the one image.

The image processing device of the present invention may further include: a handover unit that hands over a handover individual processing operation to be handed over to an image different from an image processing target subjected to the first image processing or the second image processing, to the different image, in a case in which the first image processing or the second image processing received by the image processing unit includes the handover individual processing operation.

Further, the image processing device of the present invention may further include: a setting unit that sets the common processing operation, wherein in a case in which the handover individual processing operation is the same as the common processing operation set by the setting unit and is a common processing operation that is not received, the handover unit does not hand over the handover individual processing operation to the different image.

Further, the image processing device of the present invention may further include: a prohibition unit that prohibits reception of the common processing operation after the image processing unit receives an individual processing operation.

Further, in the image processing device of the present invention, in a case in which the common image generation unit receives a re-common processing operation for the original image subjected to common processing, the common image generation unit may reflect the re-common processing operation in the first image and the second image.

Further, in the image processing device of the present invention, the reflecting unit may further reflect a re-common processing operation in a case in which the reception unit receives a common processing operation as the re-common processing operation again after the reflecting unit reflects the common processing operation received by the reception unit.

Further, in the image processing device of the present invention, the reception unit may receive only a common processing operation to be reflected in the first image and the second image.

Further, in the image processing device of the present invention, in a case in which the reflecting unit reflects the common processing operation in the first image and the second image, the reflecting unit may select a common processing operation to be reflected in each of the first image and the second image from among the common processing operations and reflect the common processing operation in each of the first image and the second image.

An image processing system of the present invention includes: the image processing device of the present invention; a display unit that displays an image subjected to image processing by the image processing device; and an operation unit that performs a processing operation for the image processing device.

An image processing program of the present invention causes a computer to function as each unit of the image processing device of the present invention.

An image processing method of the present invention is an image processing method of an image processing device that generates plural different images subjected to different image processing from an original image which is a radiographic image, the image processing method including: causing a common image generation unit to receive a common processing operation for the original image and perform common processing corresponding to the received common processing operation on the original image to generate an original image subjected to common processing; causing a first image generation unit to perform first image processing on the original image subjected to common processing to generate a first image; and causing a second image generation unit to perform second image processing different from the first image processing on the original image subjected to common processing to generate a second image.

An image processing method of the present invention includes: causing a generation unit to generate a first image and a second image by performing image analysis processes having different processing conditions on an original image which is a radiographic image; causing a reception unit to receive one or more common processing operations for the original image; and causing a reflecting unit to reflect the common processing operations received by the reception unit in the original image before the generation unit performs the image analysis processes having different processing conditions.

According to the present invention, it is possible to reduce a load of the processing operations of a user.

DESCRIPTION OF EMBODIMENTS

Hereinafter, an example of this embodiment will be described with reference to the respective drawings.

[First Embodiment]

Figure 1:
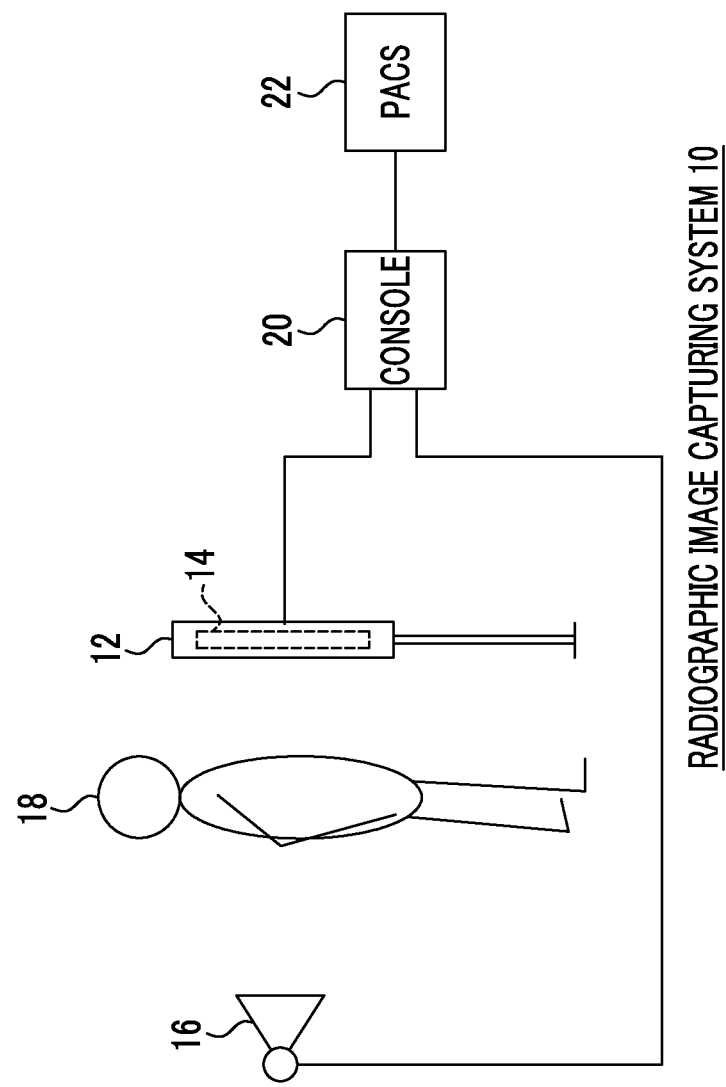
FIG. 1 is a schematic configuration diagram illustrating a schematic configuration of an example of a radiographic image capturing system according to a first embodiment.

First, a schematic configuration of a radiographic image capturing system that performs image processing of a radiographic image using a console functioning as an image processing device of this embodiment. FIG. 1 is a schematic configuration diagram of an example of a radiographic image capturing system according to this embodiment.

A radiographic image capturing system 10 includes a radiographic image capturing device 12, a radiation irradiation device 16, and a console 20. The console 20, the radiographic image capturing device 12, and the radiation irradiation device 16 are connected to each other either wiredly or wirelessly.

The radiation irradiation device 16 has a function of irradiating a subject 18 with a radiation (for example, X-ray). The radiographic image capturing device 12 includes a radiation detector 14 that detects the radiation radiated from the radiation irradiation device 16 and transmitted through the subject 18. The radiation detector 14 of this embodiment is not particularly limited. For example, the radiation detector 14 may be a radiation detector of an indirect conversion type that converts light obtained by converting the radiation to charge. Further, the radiation detector 14 may be, for example, a radiation detector of a direct conversion type that directly converts the radiation to charge.

The console 20 has a function of performing capturing of the radiographic image according to an operation of a user who is a doctor or a radiological technician based on an instruction (imaging menu) input from an external system (for example, radiology information system (RIS)). Further, the console 20 in this embodiment has a function of acquiring the radiographic image from the radiographic image capturing device 12 and outputting the radiographic image to a picture archiving and communication system (PACS) 22.

When capturing of the radiographic image is performed, the radiation detector 14 of the radiographic image capturing device 12 is irradiated with the radiation carrying image information by being radiated from the radiation irradiation device 16 and transmitted through the subject 18 located in an imaging position according to a timing based on the control of the console 20. The radiographic image capturing device 12 detects the radiation radiated by the radiation detector 14, generates a radiographic image according to the detected radiation, and outputs the radiographic image to the console 20. The captured radiographic image is output from the console 20 to the PACS 22 which is an example of the image processing system, and managed by the PACS 22.

The image processing device of this embodiment is included in the console 20 and has a function of performing image processing of a radiographic image. Hereinafter, in a case in which plural types of images such as an "common processing image (will be described below in detail)" may be collectively referred to a "radiographic image" since the images are images based on radiated radiation.

Figure 2:
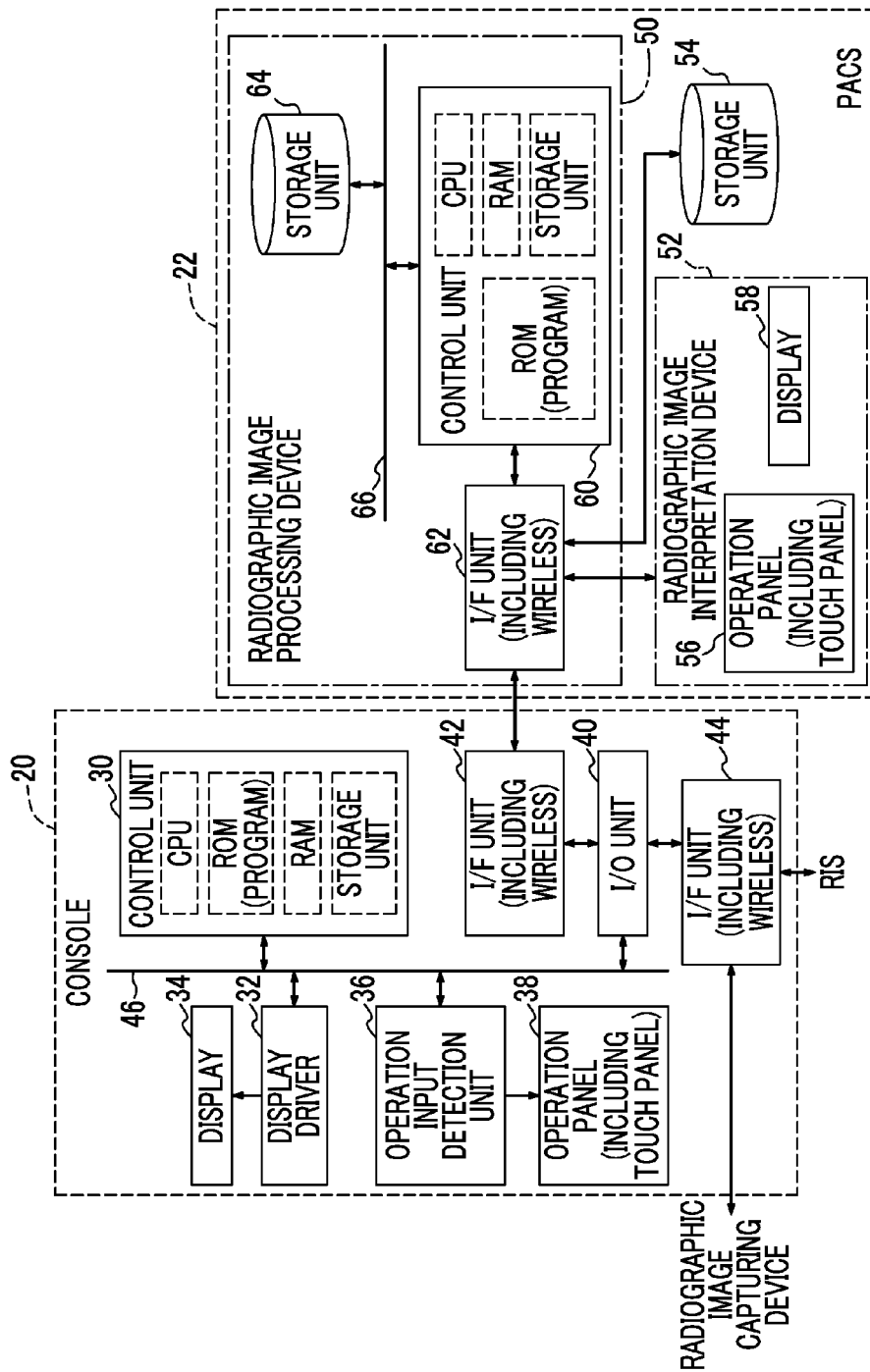
FIG. 2 is a schematic configuration diagram of an example of a console and a PACS according to the first embodiment.

FIG. 2 is an example of a schematic configuration diagram of the console 20 for describing an image processing function. The image processing device may be included in the PACS 22. Further, "image processing" in this embodiment includes conversion of image quality, rotation, inversion, marker superimposition, comment writing, and the like, and refers to all processing performed on images (various images including a radiographic image).

The console 20 in this embodiment is a server computer. The console 20 includes a control unit 30, a display driver 32, a display 34, an operation input detection unit 36, an operation panel 38, an input output (I/O) unit 40, an interface (I/F) unit 42, and an I/F unit 44.

The control unit 30 has a function of controlling an entire operation of the console 20, and includes a central processing unit (CPU), a read only memory (ROM), a random access memory (RAM), and a storage unit. The CPU has a function of controlling an entire operation of the console 20. For example, various programs including an image processing program used by the CPU are stored in the ROM in advance. The RAM has a function of temporarily storing various data. The storage unit is, for example, a hard disk drive (HDD), and has a function of storing and holding various data. The storage unit has a function of storing, for example, a definition of a type of processing operations to be described below in detail or a definition of handover conditions. Further, the control unit 30 has a function of performing image processing on various images.

The display driver 32 has a function of controlling display of various information on the display 34. The display 34 of this embodiment has a function of displaying an imaging menu, a captured radiographic image, or the like. The operation input detection unit 36 has a function of detecting an operation state or a processing operation for the operation panel 38. The operation panel 38 is used for the user to input a processing operation relating to capturing of the radiographic image or image processing of the captured radiographic images. In this embodiment, the operation panel 38 includes, for example, a touch panel, a touch pen, plural keys, and a mouse. In a case in which the operation panel 38 is a touch panel, the operation panel 38 may be the same as the display 34.

Further, the I/O unit 40 and the I/F unit 42 have a function of transmitting and receiving various information to and from a radiographic image processing device 50 of the PACS 22 through wireless communication or the like. Further, the I/F unit 44 has a function of transmitting and receiving various information between the radiographic image capturing device 12 and the RIS.

The control unit 30, the display driver 32, the operation input detection unit 36, and the I/O unit 40 are connected to each other such that exchange of information can be performed via a bus 46, such as a system bus or a control bus. Accordingly, the control unit 30 can perform control of a display of various information on the display 34 via the display driver 32 and control of transmission and reception of various information to and from the PACS 22 via the I/F unit 42.

The PACS 22 of this embodiment includes the radiographic image processing device 50, a radiographic image interpretation device 52, and a storage unit 54.

The radiographic image processing device 50 of this embodiment has a function of controlling storage in the storage unit 54 of the radiographic image received from the radiographic image capturing device 12 based on an instruction from the console 20. The radiographic image processing device 50 has a function of controlling display of various images on the radiographic image interpretation device 52. Further, the radiographic image processing device 50 has a function of performing image processing on various images.

The radiographic image processing device 50 of this embodiment includes a control unit 60, an I/F unit 62, and a storage unit 64.

The control unit 60 has a function of controlling the entire PACS 22. The control unit 60 includes a CPU, a ROM, a RAM, and a storage unit. The CPU has a function of controlling an operation of the PACS 22. Various programs or the like used by the CPU are stored in the ROM in advance. The RAM has a function of temporarily storing various data. The storage unit is an HDD or the like, and has a function of storing and holding various data.

The storage unit 64 has a function of storing the radiographic image output from the console 20. An example of the storage unit 64 includes an HDD.

The I/F unit 62 has a function of transmitting and receiving various information to and from the console 20 through wireless communication or the like.

The control unit 60 and the storage unit 64 are connected so that the control unit 60 and the storage unit 64 can exchange information with each other via a bus 66 such as a system bus or a control bus.

The storage unit 54 of this embodiment has a function of storing the radiographic image, various images subjected to image processing by the radiographic image processing device 50, and information related to various images. An example of the storage unit 54 may include an HDD.

Further, the radiographic image interpretation device 52 of this embodiment is a device having a function of enabling a radiologist to interpret the radiographic image or various images subjected to image processing, and is not particularly limited. The radiographic image interpretation device may include an interpretation viewer or a console, a tablet terminal, and the like. The radiographic image interpretation device 52 of this embodiment is a personal computer. The radiographic image interpretation device 52 includes a CPU, a ROM, a RAM, a storage unit, a display driver, a display 58, an operation input detection unit, an operation panel 56, an I/O unit, and an I/F unit, similar to the console 20 or the radiographic image processing device 50. In FIG. 2, in order to avoid complication of the description, only the display 58 and the operation panel 56 in the above configuration are illustrated and other descriptions are omitted.

In the radiographic image capturing system 10 of this embodiment, it is possible to acquire plural radiographic images having different purposes through one imaging. In this embodiment, "one imaging" refers to one (a series of) imaging set by an imaging menu or the user, and the number of radiographic images to be captured may be one or plural. Further, in this embodiment, "one imaging" may be for any one of a still image and a moving image. Hereinafter, capturing the plural radiographic images having different purposes through one imaging is referred to as "multi-purpose imaging."

In this embodiment, the "plurality of images having different purposes" are not particularly limited, and refer to radiographic images for examination purpose or radiographic images used for a radiologist such as a doctor to perform different medical examination and diagnosis. For example, the plural images having different purposes may include a radiographic image obtained through general chest radiography in health diagnosis, and a radiographic image for pneumoconiosis examination. Further, for example, the plural images having different purposes include a normal radiographic image for general medical examination, and an image for special purpose. The image for special purpose may include an image for confirmation of artifacts, a catheter-enhanced image, and a gauze-enhanced image, and the like, and is not particularly limited.

In a case in which the multi-purpose imaging is instructed by the imaging menu or the user, the console 20 in this embodiment uses the radiographic image obtained by one imaging as an original image and performs different image processing on the original image to generate plural radiographic images having different purposes. In this embodiment, the "original image" refers to a radiographic image subjected to image processing determined to be uniformly performed on all radiographic images regardless of purposes, for the radiographic images captured by the radiographic image capturing device 12.

Plural radiographic images having different purposes generated by multi-purpose imaging, an original image of the multi-purpose imaging, and a radiographic image generated by imaging that is not the multi-purpose imaging (imaging in a case in which one type of radiographic image is generated from images obtained by one imaging) may not be discriminated based on appearance of the radiographic image. In this embodiment, an identifier for distinguishing between both of the images is associated with each radiographic image (including the original image) and displayed on the display 34 according to a setting or the desire of the user. The identifier is not particularly limited as long as the user can recognize how the radiographic image has been captured and what image the radiographic image is, and may be any one of a mark, a number, and a name.

Hereinafter, image processing in multi-purpose capturing of the console 20 in this embodiment will be described with reference to the drawings. Hereinafter, a case in which a general image for chest radiography (purpose A image) and an image for pneumoconiosis examination (purpose B image) are generated through multi-purpose imaging will be described as a specific example.

First, a basic form of image processing in multi-purpose imaging of the console 20 will be described. The control unit 30 in the basic form corresponds to an example of the common image generation unit, the first image generation unit, and the second image generation unit.

Figure 3:
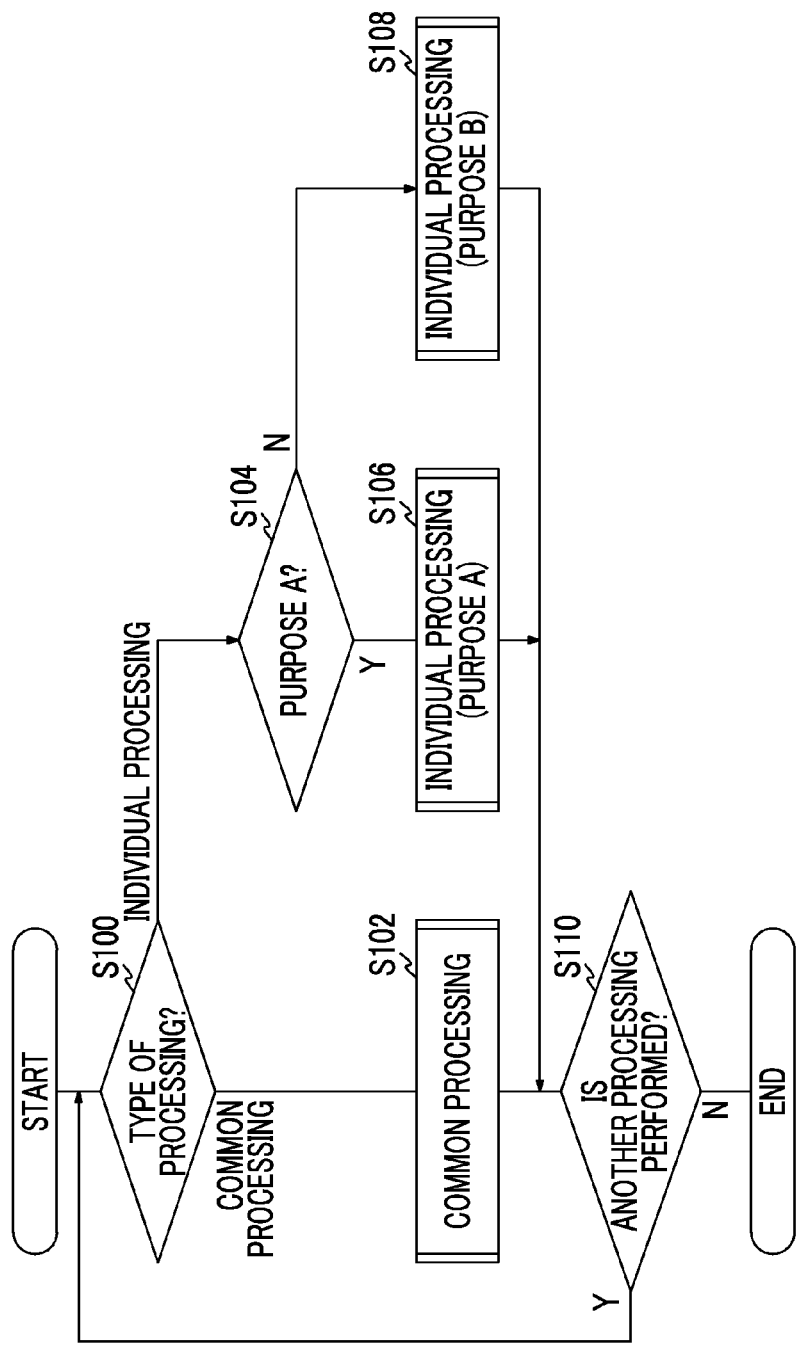
FIG. 3 is a flowchart illustrating an entire flow of an example of image processing executed by a control unit of the console of the first embodiment.

FIG. 3 illustrates a flowchart showing an example of an entire flow of an example of image processing executed by the control unit 30 of the console 20 in this embodiment. In the console 20 in this embodiment, the control unit 30 executes the image processing program stored in the ROM, and accordingly, functions as each means of the present invention to execute image processing illustrated in FIG. 3.

In this embodiment, a case in which the user performs a processing operation using the operation panel 38 of the console 20 will be described. In the image processing below, the console 20 displays various images on the display 34.

In step S100, the control unit 30 selects a type of processing. In this embodiment, as the type of processing, two types including common processing (common processing operation) and individual processing (individual processing operation) are provided. The common processing refers to processing (processing operation) to be performed on an original image. Further, the individual processing refers to processing (processing operation) to be performed on each of an image for purpose A and an image for purpose B.

Figure 4:
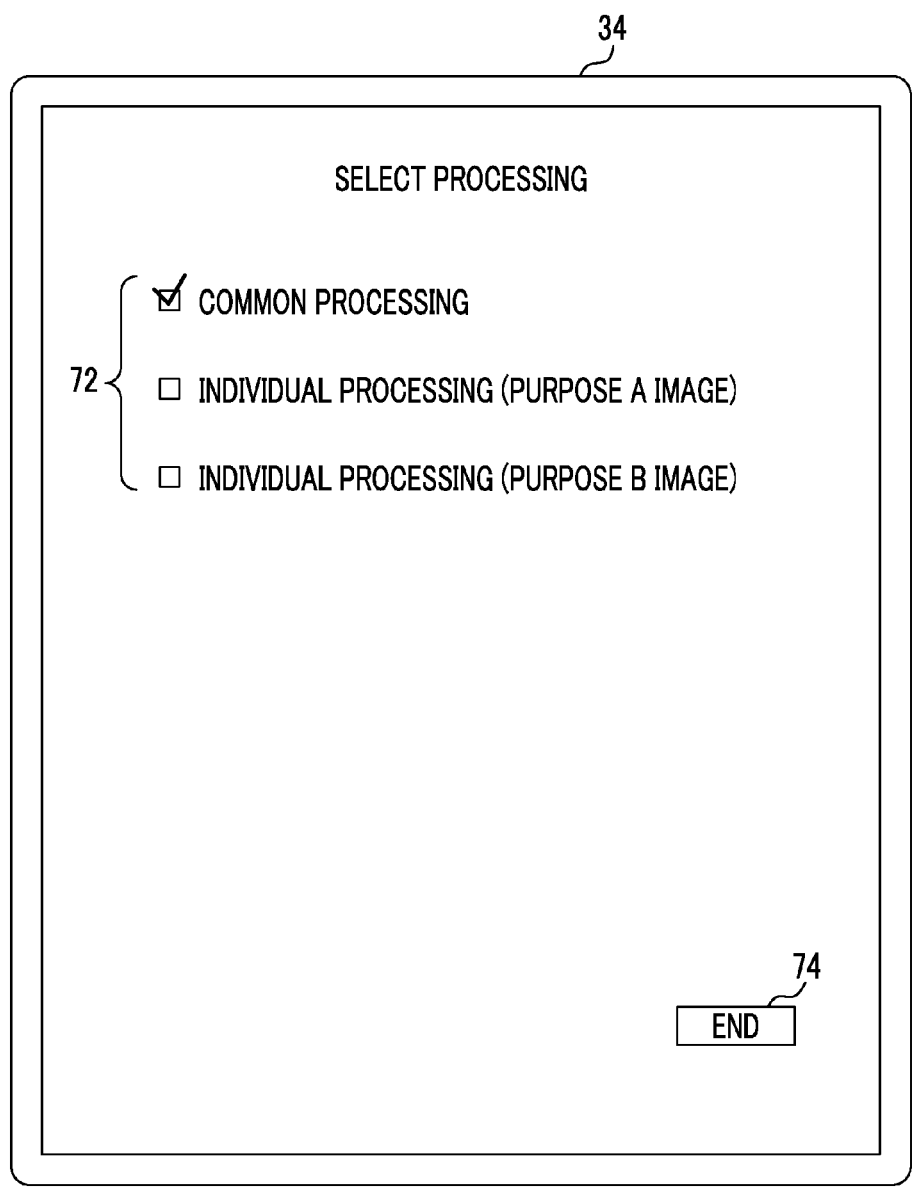
FIG. 4 is an illustrative diagram for describing an example of a display for causing a user to select a type of processing in the first embodiment.

In this embodiment, for example, a user is caused to select a type of processing, and the type of processing selected by the user is determined. A selection method may include a method of performing a display for requesting the user to select the type with respect to the display 34. FIG. 4 illustrates an example of a display for causing the user to select a type of processing. In the specific example illustrated in FIG. 4, a check box 72 for selecting common processing, individual processing (purpose A image), and individual processing (purpose B image), and an end button 74 are displayed on the display 34. In the specific example illustrated in FIG. 4, a state in which common processing is selected is illustrated. The selection by the user is completed by the end button 74 being buttoned down (hereinafter referred to as "indicated") by the user.

While only names of the types of processing are displayed in FIG. 4, images corresponding to the types of processing may also be displayed. For example, for the common processing, the original image may be displayed. Further, for example, for the individual processing (purpose A image) according to the image processing of this embodiment, the original image subjected to common processing which is an initial image for purpose A is displayed, and for the individual processing (purpose B image), an initial image for purpose B may be displayed.

In a case in which the type of processing determined in step S100 is common processing, the control unit 30 proceeds to step S102, performs common processing (which will be described below in detail), and proceeds to step S110.

On the other hand, in a case in which the type of processing determined in step S100 is individual processing, the control unit 30 proceeds to step S104. In step S104, the control unit 30 further determines whether or not the individual processing is individual processing for the purpose A image. In a case in which the individual processing is individual processing for the purpose A image, the control unit 30 proceeds to step S106, performs the individual processing (purpose A) (which will be described below in detail), and proceeds to step S110. On the other hand, in a case in which the individual processing is individual processing for the purpose B image, the control unit 30 proceeds to step S108, performs the individual processing (purpose B) (which will be described below in detail), and proceeds to step S110.

In step S110, the control unit 30 determines whether to execute another processing (another type of processing). In a case in which the other processing is performed, the control unit 30 returns to step S100 and repeats this image processing. On the other hand, in a case in which the other processing is not performed, the control unit 30 ends the image processing.

Figure 5:
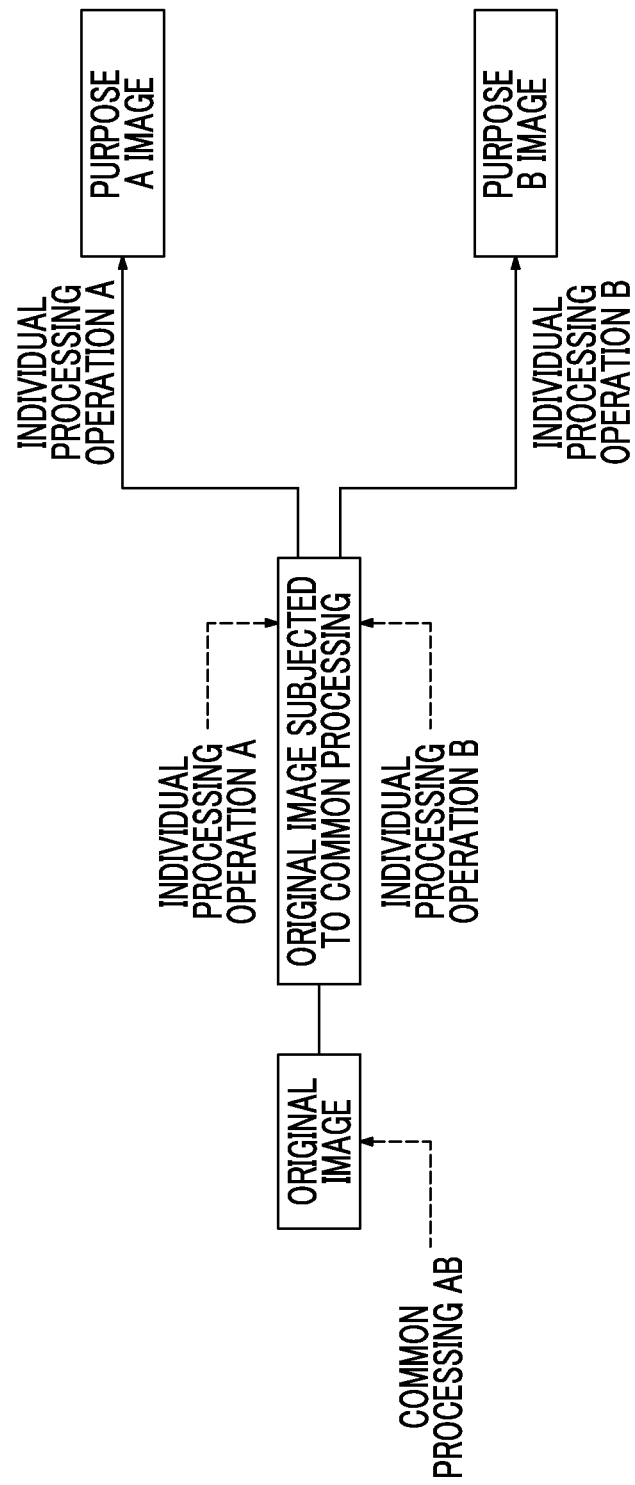
FIG. 5 is an illustrative diagram illustrating an example of a flow of image processing (processing operation) according to a basic form in a console of the first embodiment.

Next, details of the common processing, the individual processing (purpose A), and the individual processing (purpose B) in the image processing of this embodiment will be described. FIG. 5 illustrates an example of a flow of a basic form of image processing (processing operation) in the console 20 in this embodiment. As illustrated in FIG. 5, in the basic form of the image processing of this embodiment, the common processing operation is performed on the original image subjected to common processing, and then, each individual processing is performed.

Figure 6:
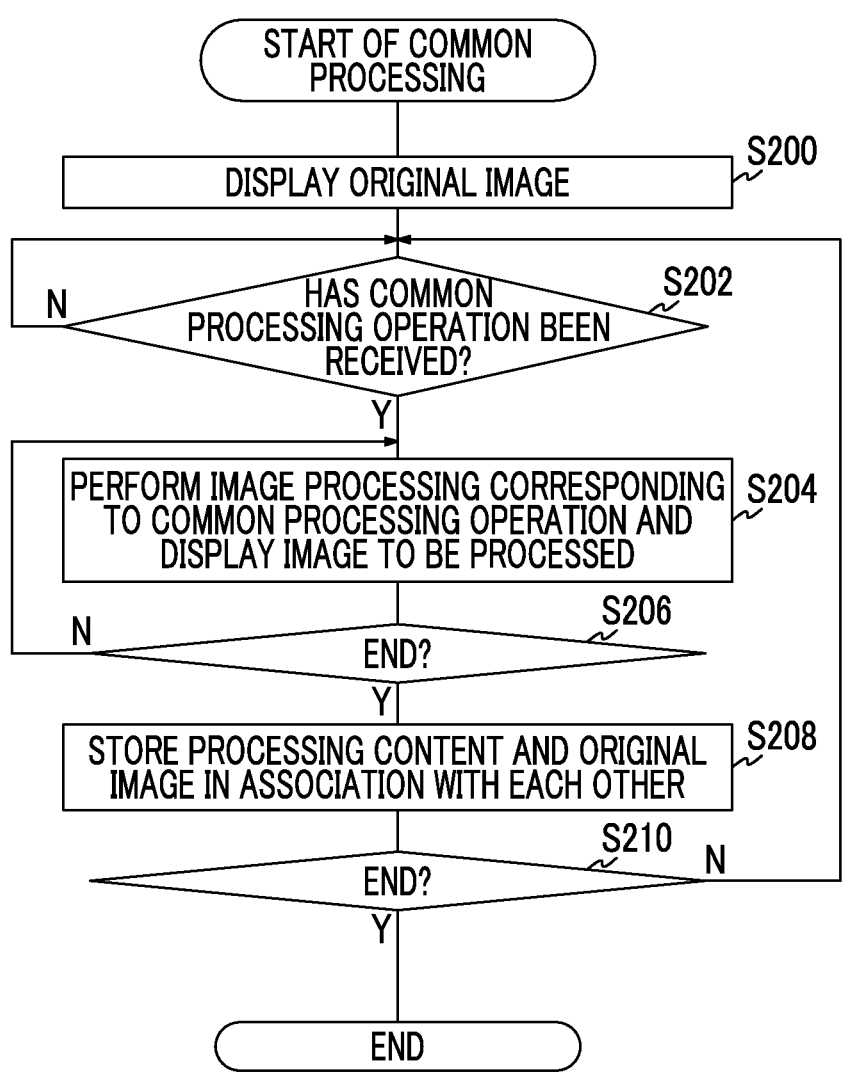
FIG. 6 is a flowchart of an example of common processing executed in image processing in the first embodiment.

Accordingly, common processing of step S102 in the image processing (see FIG. 3) is first performed. FIG. 6 illustrates a flowchart of an example of common processing executed during image processing of this embodiment.

In step S200, the control unit 30 acquires an original image and displays the original image on the display 34. The original image may be acquired from the radiographic image capturing device 12 or may be acquired from the storage unit 54 or the like of the PACS 22. In this embodiment, various displays used for the user to perform the common processing operation on the original image are displayed on the display 34 together with the original image.

Figure 7A:
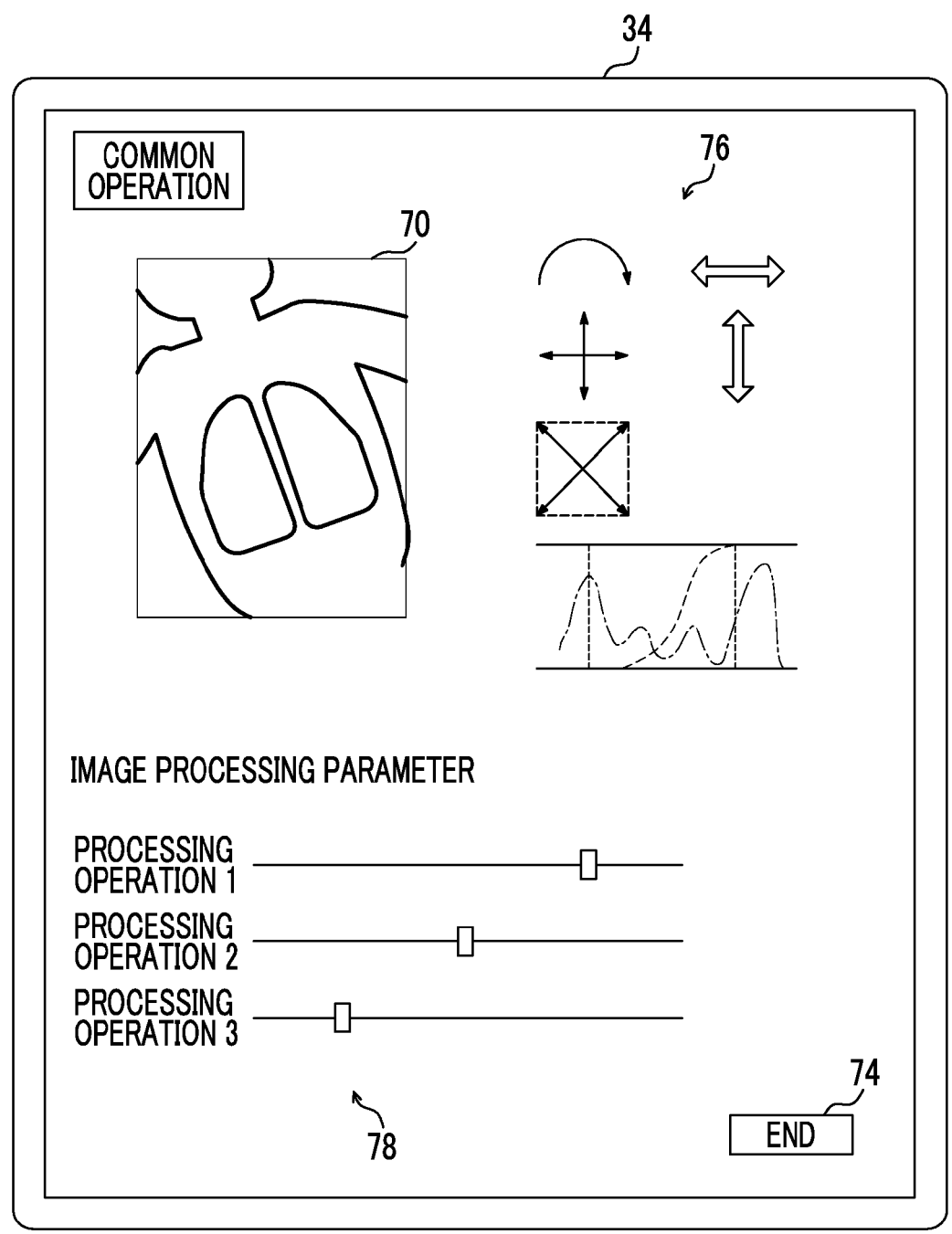
FIG. 7A is an illustrative diagram illustrating a specific example of an original image and various displays used for a user to perform a common processing operation in the first embodiment.
Figure 7B:
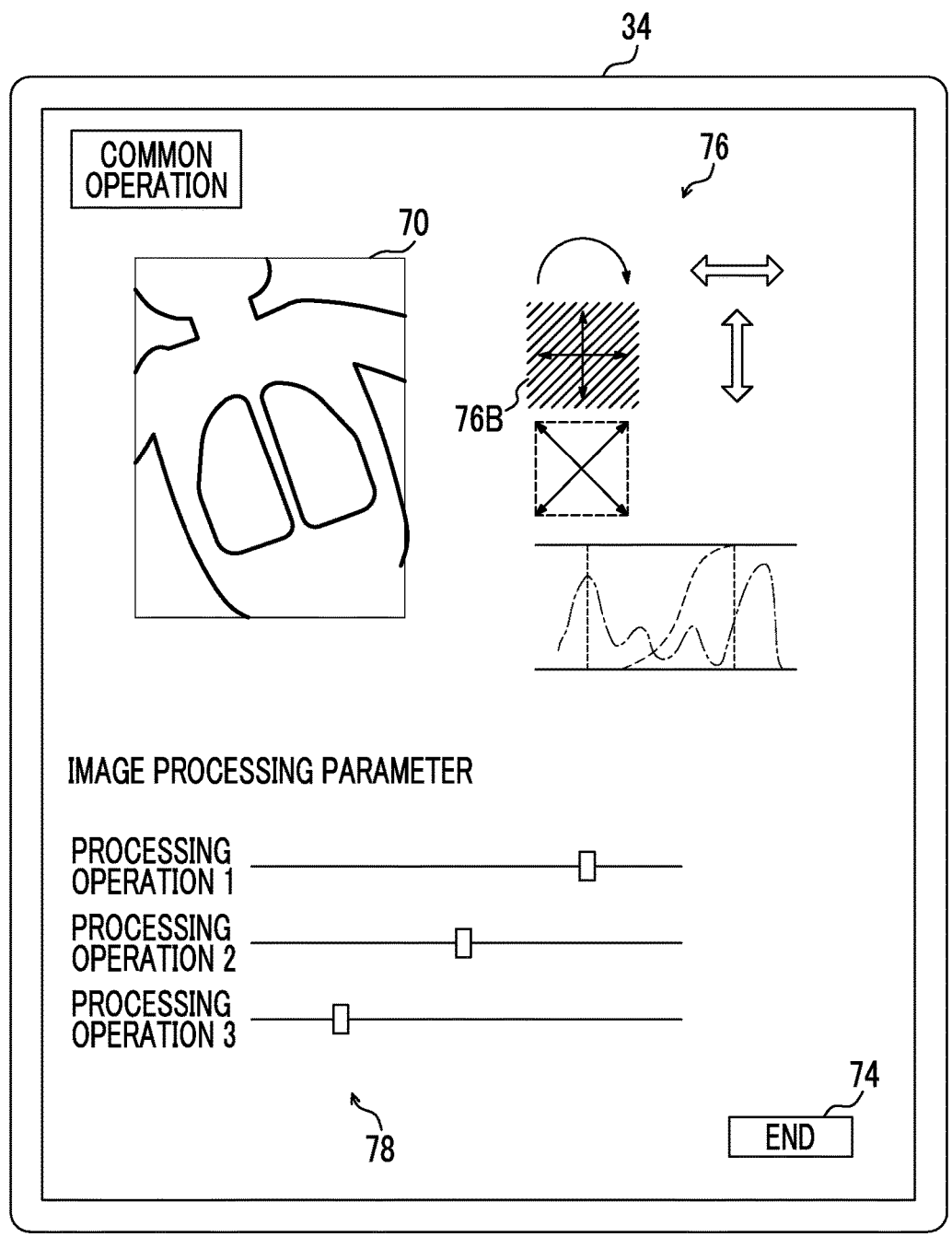
FIG. 7B is an illustrative diagram illustrating a specific example of an original image and various displays used for a user to perform a common processing operation in the first embodiment.

FIGS. 7A and 7B illustrate a specific example of an original image and various displays used for a user to perform a common processing operation in this embodiment. In the example illustrated in FIG. 7A, a type of processing and an original image 70 are displayed. Further, in one example illustrated in FIG. 7A, icons according to various processing operations used for the user to select a type of common processing operation are displayed in a processing operation selection portion 76. Icons for selecting, for example, rotation, movement, enlargement, trimming, and a histogram representing concentration, luminance, or the like are displayed in the processing operation selection portion 76 in the example illustrated in FIGS. 7A and 7B. The user selects the processing operation that is common processing from the processing operation selection portion 76 using the operation panel 38, and performs the processing operation on the original image 70. A degree (parameter) of the processing operation performed by the user is displayed in a parameter display portion 78.

In the console 20 in this embodiment, a type of common processing operation may be set by the user. In this case, the control unit 30 of the console 20 corresponds to an example of the setting unit. In the console 20 of this embodiment, a setting storage unit (not illustrated) that stores a setting of the type of common processing operation is provided in the control unit 30. By storing the setting in the setting storage unit, setting of the type of the common processing operation is performed. In the console 20 of this embodiment, in a case in which the setting of the type of the common processing operation is performed, a non-set processing operation is prohibited to be performed as common processing. In a case in which the setting of the type of the common processing operation has been performed, a mark 76B indicating the processing operation not set as the common processing operation may be displayed, as in an example illustrated in FIG. 7B. Further, for example, only the set common processing operation may be displayed, as illustrated in FIG. 7A.

The processing operation (common processing operation) performed by the user is not limited to the specific examples illustrated in FIGS. 7A and 7B.

In the image processing of this embodiment, the user performs the common processing operation on the original image 70 to reflect processing in the image for purpose A and the image for purpose B. In this embodiment, in order to distinguish the common processing operation from other processing operations, a common processing operation to reflect processing in both of the image for purpose A and the image for purpose B, and common processing performed by the console 20 according to the common processing operation are referred to as "common processing AB". Further, the original image on which the common processing operation is completed is referred to as an "original image subjected to common processing". In the common processing (FIG. 6) of the image processing in this embodiment, processing operations performed by the user are all common processing operation AB.

In step S202, the control unit 30 determines whether or not the reception of the common processing operation has started. In this embodiment, for example, in a case in which the processing operation is selected in the processing operation selection portion 76 and any operation is performed on the original image 70, the control unit 30 determines that the reception of the common processing operation has started. A specific example thereof may include a case in which the control unit 30 determines that the reception of the common processing operation has started in a case in which the control unit 30 has detected an indication of a mouse of the operation panel 38 on the original image 70. The control unit 30 becomes a standby state in a case in which the control unit 30 does not receive the common processing operation, and proceeds to step S204 in a case in which the control unit 30 receives the common processing operation.

In step S204, the control unit 30 performs image processing corresponding to the common processing operation on the original image 70, and displays the original image 70 subjected to the image processing on the display 34. That is, the images corresponding to the common processing operations performed by the user are sequentially generated, and sequentially displayed in place of the original image 70 of the display 34 illustrated in FIG. 7.

Then, in step S206, the control unit 30 determines whether or not the common processing operation had ended. A specific example thereof may include a case in which, in a case in which the control unit 30 has detected the start of reception of the common processing operation in response to an instruction (button-down) of the mouse of the operation panel 38 by the user, the control unit 30 determines a time point of button-up to be end of the common processing operation. In a case in which the common processing operation had not ended, the control unit 30 returns to step S204 and repeats the processing. On the other hand, in a case in which the common processing operation had ended, the control unit 30 proceeds to step S208.

In step S208, processing content of the received common processing operation and the original image are stored in the storage unit of the control unit 30 in association with each other. In a case in which the user performs plural operations for the same common processing operation, each piece of the processing content may be stored or overall processing content may be stored. An example thereof may include a case in which a common processing operation of rotating the original image 70 is performed four times, including 15° right rotation, 10° left rotation, 15° right rotation, and 30° right rotation. Four pieces of content including "15° right rotation", "10° left rotation", "15° right rotation", and "30° right rotation" may be stored as the process content, or only "50° right rotation" may be stored.

Further, a method of associating and storing the original image and the processing content is not limited. For example, both of the original image and the processing content ("50° right rotation") may be associated with each other and stored as described above or image information of an image obtained by performing image processing (common processing) according to the processing content on the original image may be stored.

Then, in step S210, the control unit 30 determines whether or not the common processing operations by the user have all ended. In this embodiment, the control unit 30 determines that the common processing operations have ended in a case in which the control unit 30 detects that the end button 74 displayed on the display 34 illustrated in FIGS. 7A and 7B is indicated by the user. In a case in which the common processing operations have not ended, the control unit 30 returns to step S202 and repeats each of the processes of steps S202 to S208 for a new common processing operation. On the other hand, in a case in which the control unit 30 detects that the end button 74 is indicated by the user, the control unit 30 ends this common processing. A method of determining whether or not the common processing operations have ended is not particularly limited. For example, in a case in which the control unit 30 detects that the user has selected the original image subjected to common processing in order to perform the individual processing operation, the control unit 30 may determine whether or not the common processing operations have ended.

In the image processing of this embodiment, in a case in which the common processing (step S102 in FIG. 3, and FIG. 6) ends, the individual processing is performed. For the individual processing, either the individual processing (purpose A) (step S106 in FIG. 3) and the individual processing (purpose B) (step S108 in FIG. 3) may be first performed. Hereinafter, for convenience of description, the individual processing (purpose A) will be described.

Figure 8:
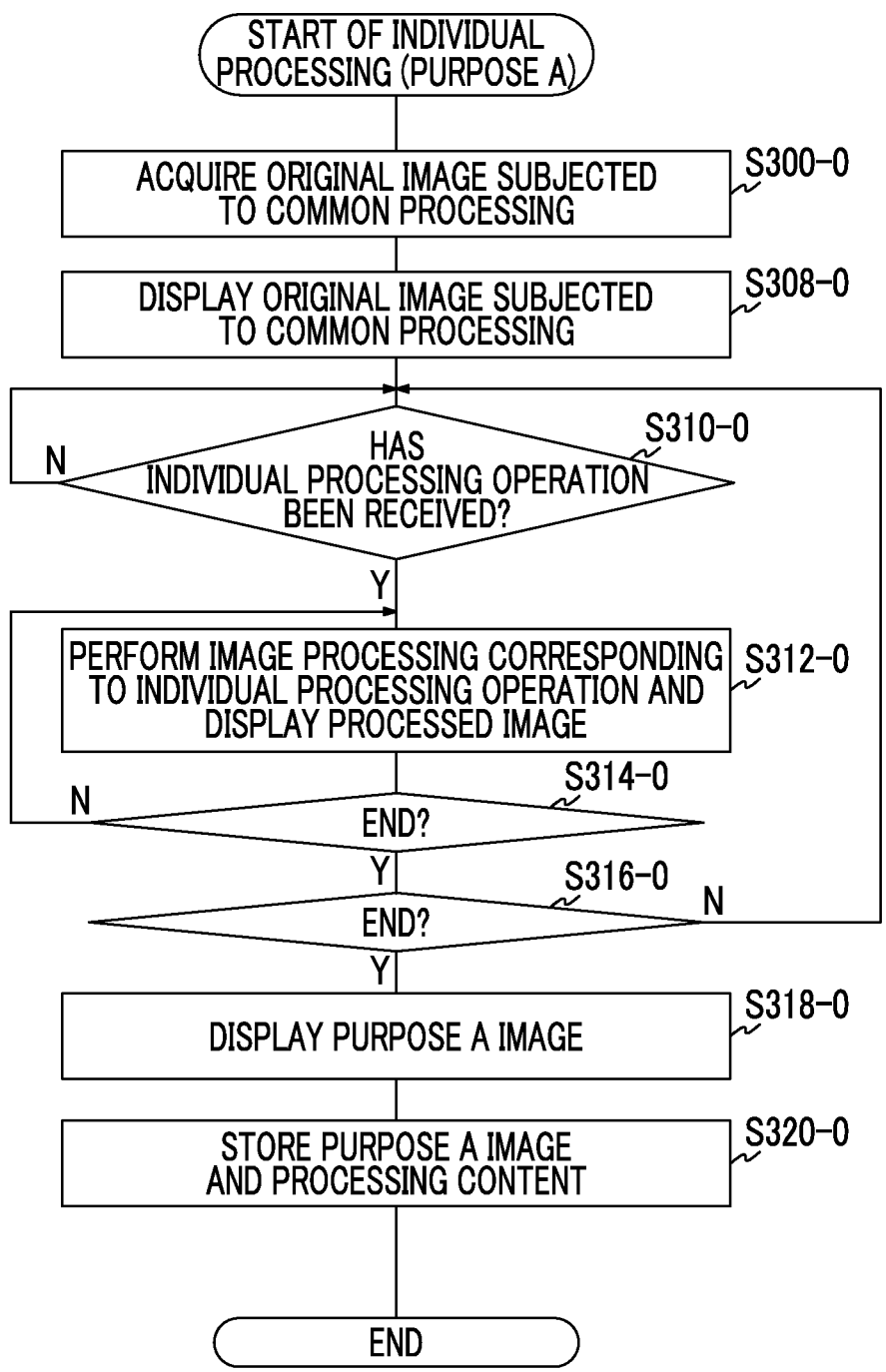
FIG. 8 is a flowchart of an example of individual processing (purpose A) performed in image processing according to a basic form of the first embodiment.

FIG. 8 illustrates a flowchart of an example of individual processing (purpose A) executed during image processing according to a basic form of this embodiment.

In step S300-0, the control unit 30 acquires the original image subjected to common processing from the storage unit of the control unit 30.

In step S308-0, the acquired original image subjected to common processing is displayed on the display 34 as the image for purpose A which is a base for generating the purpose A image. In this embodiment, various displays used for the user to perform an individual processing operation on the image for purpose A is displayed on the display 34 together with the image for purpose A. In this embodiment, an individual processing operation performed by the user in order to generate the purpose A image is referred to as "individual processing operation A".

Then, in step S310-0, the control unit 30 determines whether the individual processing operation has started. In this embodiment, for example, in a case in which the processing operation is selected in the processing operation selection portion 76 and any operation is performed on the image 70A for purpose A, it is determined that the individual processing operation has been received. A specific example may include a case in which it is determined that reception of the individual processing operation has started in a case in which an instruction of a mouse of the operation panel 38 is detected on the first image 70A for purpose A. In a case in which the individual processing operation has not been received, the control unit 30 becomes a standby state, and in a case in which the processing operation has been received, the control unit 30 proceeds to step S312-0.

In step S312-0, the control unit 30 performs image processing corresponding to the individual processing operation on the image 70A for purpose A, and displays the image 70A for purpose A subjected to the image processing on the display 34.

Then, in step S314-0, the control unit 30 determines whether or not the individual processing operation has ended. A specific example thereof may include a case in which in a case in which the control unit 30 detects the start of reception of the individual processing operation in response to an indication of the mouse of the operation panel 38 by the user, the control unit 30 determines a time point of button-up to be end of the individual processing operation. In a case in which the individual processing operation has not ended, the control unit 30 returns to step S312-0 to repeat the processing. On the other hand, in a case in which the individual processing operation has ended, the control unit 30 proceeds to step S316-0.

In step S316-0, the control unit 30 determines whether or not all of the individual processing operations performed by the user had ended. In a case in which the individual processing operations have not ended, the control unit 30 returns to step S310-0 and repeats the process of each of steps S310-0 to S314-0 for a new individual processing operation. On the other hand, in a case in which the control unit 30 has detected that the end button 74 is instructed by the user, the control unit 30 proceeds to step S318-0.

In this embodiment, since the generation of the purpose A image ends due to the end of the individual processing operation, the control unit 30 displays the purpose A image on the display 34 to cause the user to confirm the purpose A image in step S318-0.

In a case in which the control unit 30 detects the end of generation of the purpose A image, the control unit 30 proceeds to step S320-0. In step S320-0, the control unit 30 stores the image information of the purpose A image and processing content of processing (including the image analysis process, the common processing, and the individual processing) performed for generation of the purpose A image in the storage unit of the control unit 30 in association with each other, and then ends this individual processing (purpose A). A method of storing the image information of the purpose A image and the processing content is not particularly limited.

Since individual processing (purpose B) for generating a purpose B image (step S108 in FIG. 3) is the same as the individual processing (purpose A), in which "A" in the above individual processing (purpose A) may be replaced with "B", and a process of each step in the individual processing (purpose B) is the same as that in the individual processing (purpose A), detailed description is omitted. That is, the original image subjected to common processing is set to the image for purpose B and individual processing is performed on the image to generate the purpose B image. In this embodiment, an individual processing operation performed by the user in order to generate the purpose B image is referred to as "individual processing operation B".

Thus, in the basic form of this embodiment, the control unit 30 of the console 20 first performs a common processing operation on the original image. The control unit 30 sets an original image subjected to common processing to the image for purpose A and generates the purpose A image by performing individual processing (purpose A). Further, the control unit 30 sets the original image subjected to common processing to the image for purpose B and generates a purpose B image by performing individual processing (purpose B).

Figure 9:
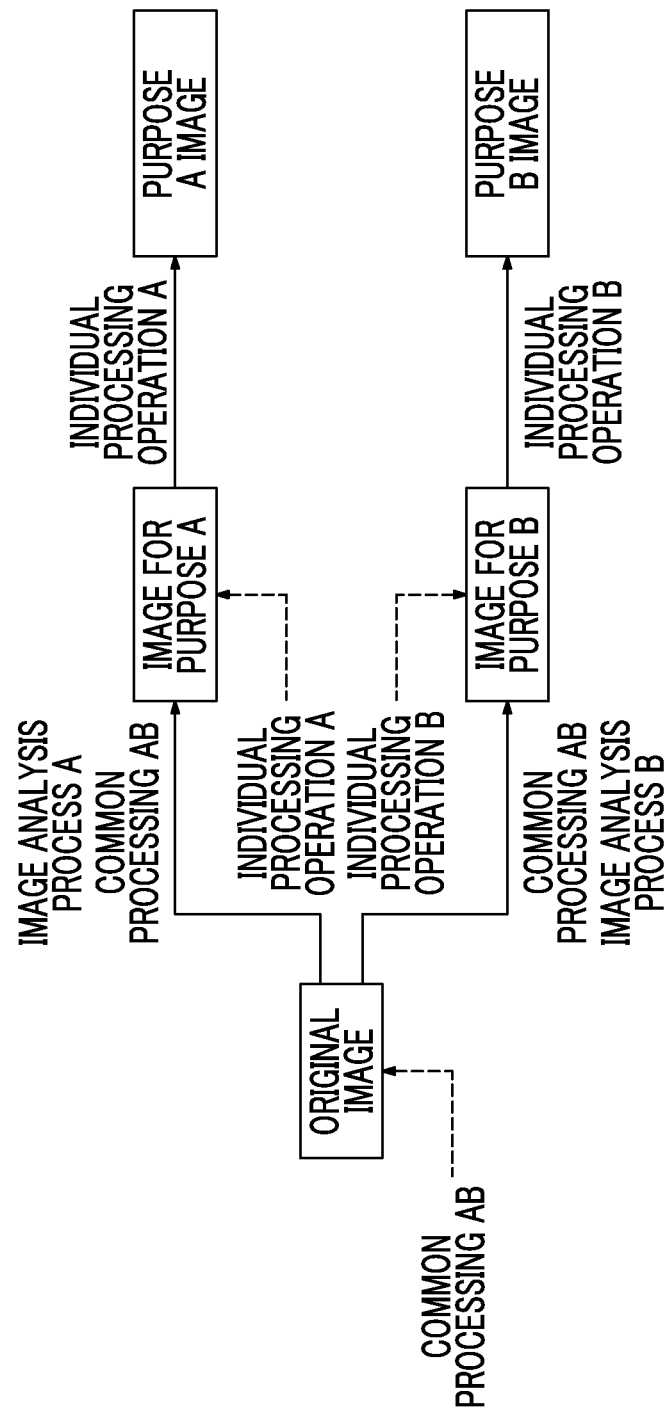
FIG. 9 is an illustrative diagram illustrating an example of a flow of image processing (processing operation) according to an application form in a console of an application form of the first embodiment.

Next, image processing according to an application form of this embodiment will be described. FIG. 9 illustrates an example of a flow of an application form of image processing (processing operation) in the console 20 of this embodiment. As illustrated in FIG. 9, in the application of the image processing of this embodiment, a common processing operation is performed on the original image subjected to common processing, and then, individual processing is performed.

The control unit 30 of the console 20 in the application form corresponds to an example of the generation unit, reflecting unit, and the image processing unit. Further, the I/F unit 42 of the console 20 corresponds to an example of the reception unit.

Since a flow of entire image processing of the application form and common processing are the same as those in the above-described basic form (see FIGS. 3 and 6), description thereof will be omitted.

The individual processing according to the application form of this embodiment will be described.

Figure 10:
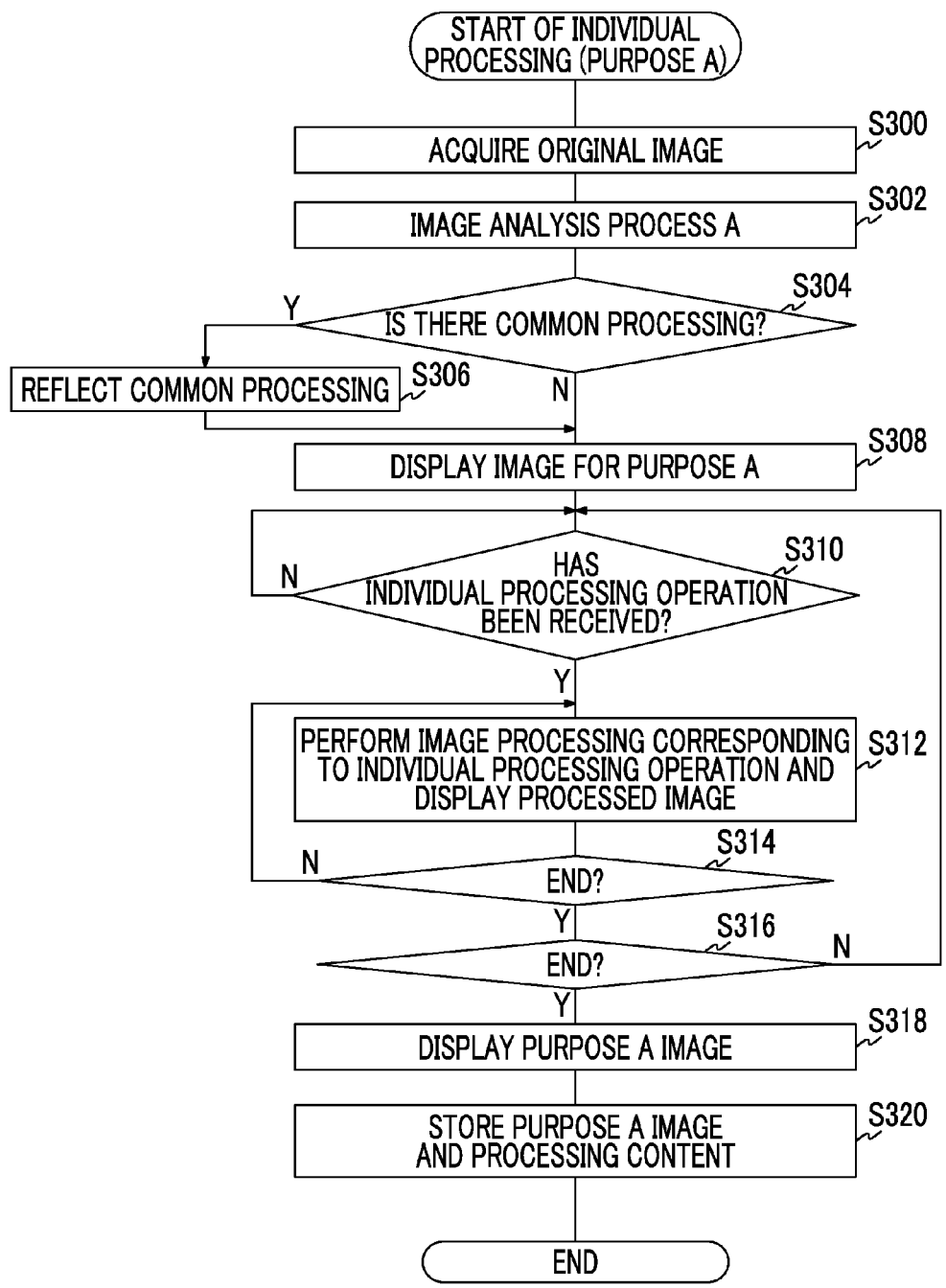
FIG. 10 is a flowchart of an example of individual processing (purpose A) performed in image processing according to the application form of the first embodiment.

FIG. 10 illustrates a flowchart of an example of individual processing (purpose A) performed during image processing according to the application form of this embodiment.

In this embodiment, the "image analysis process" refers to image processing automatically performed by the console 20 (without an instruction from the user). Further, "image analysis process A" and "image analysis process B" in this embodiment are predetermined image analysis processes in order to generate the purpose A image and the purpose B image from the original image. Image analysis process A and image analysis process B are not particularly limited except that image analysis process A and image analysis process B are determined depending on purposes and are processing having different processing conditions. For the "different processing conditions", for example, image analysis process A and image analysis process B may be completely different type of image processing or may be the same type (for example, gradation process) of image processing with different parameters.

In step S300, the control unit 30 acquires the original image and displays the original image on the display 34. The original image may be acquired from the radiographic image capturing device 12 or may be acquired from, for example, the storage unit 54 of the PACS 22.

Then, in step S302, the control unit 30 performs image analysis process A on the original image. Then, in step S304, the control unit 30 determines whether there is common processing. In this embodiment, in a case in which processing content of the common processing operation is stored in association with the original image in common processing (step S102 in FIG. 3, and FIG. 6), the control unit 30 determines that there is common processing and proceeds to step S306. In step S306, the control unit 30 reflects the processing content of the common processing operation in the original image subjected to image analysis process A to generate an image for purpose A (see FIG. 9).

While the common processing is first performed in image processing of this embodiment as described above, a case in which the common processing is not performed may be included. In such a case, the control unit 30 determines that there is no common processing in step S304, sets the original image subjected to image analysis process A to the image for purpose A, and proceeds to step S308.

Figure 11:
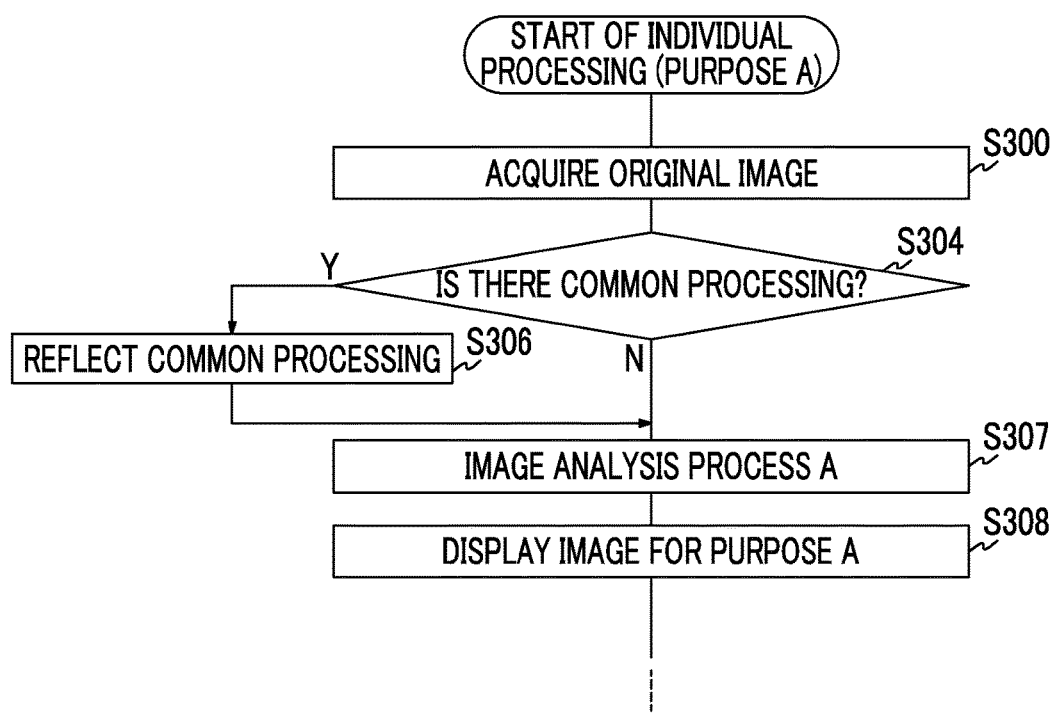
FIG. 11 illustrates an example of a flowchart of another processing of steps S300 to S308 of individual processing (purpose A) which is processing for generating an image for purpose A illustrated in FIG. 8.

A method of generating the image for purpose A is not limited. FIG. 11 illustrates an example of a flowchart of another processing of steps S300 to S308 of individual processing (purpose A) which is processing for generating the image for purpose A. In the example illustrated in FIG. 11, image analysis process A is performed after steps S304 and S306. In the example illustrated in FIG. 11, after common processing is performed on the original image, image analysis process A is performed on the original image subjected to common processing. Further, for example, in the method of generating the image for purpose A, in the common processing (step S102 in FIG. 3, and FIG. 6), in a case in which image information of the original image subjected to common processing has been stored, the image information may be acquired and image analysis process A may be performed.

Then, in step S308, the control unit 30 displays the image for purpose A on the display 34. In this embodiment, the control unit 30 displays various displays used for the user to perform an individual processing operation on the image for purpose A on the display 34 together with the image for purpose A.

Figure 12:
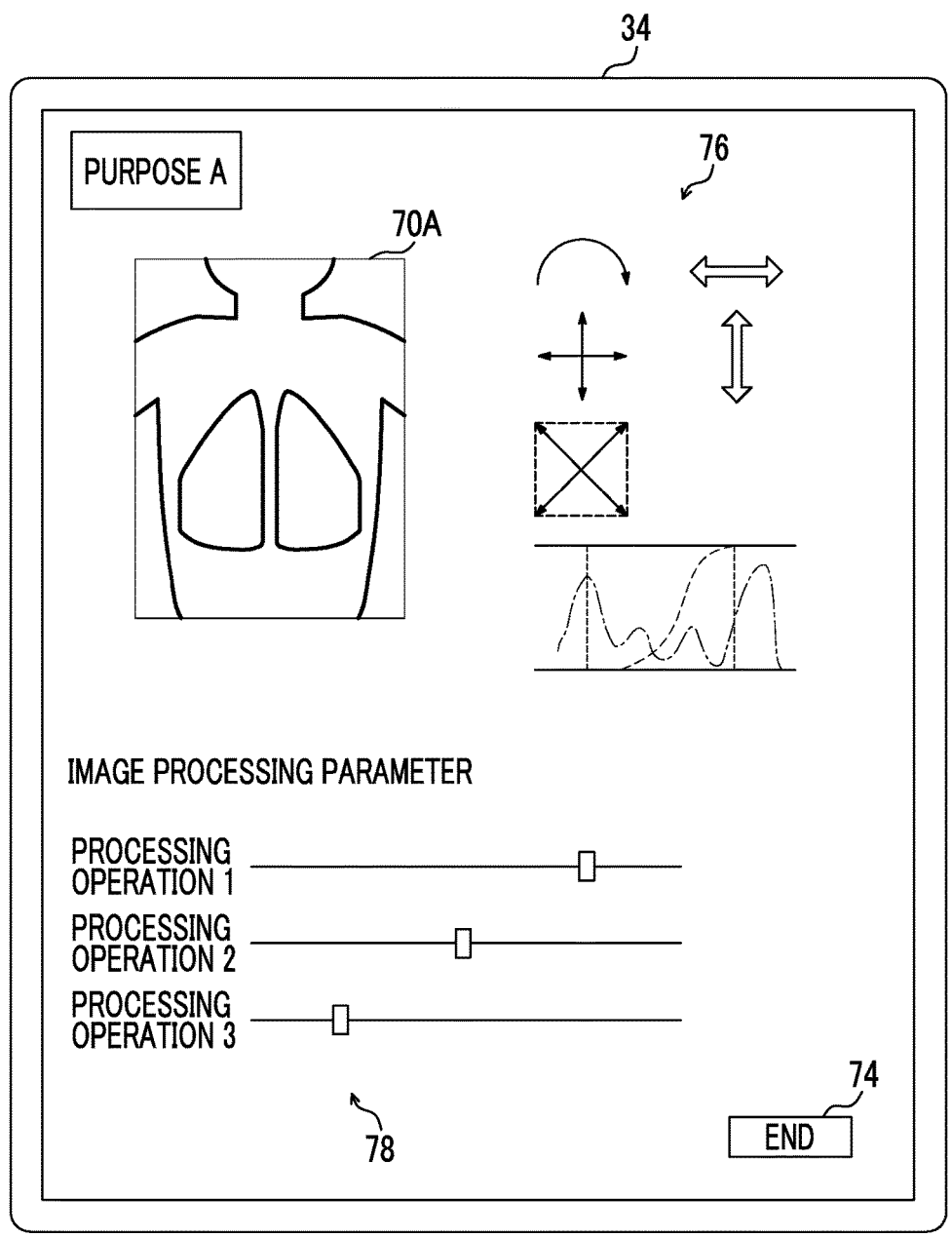
FIG. 12 is an illustrative diagram illustrating an example of an image for purpose A and various displays used for a user to perform an individual processing operation in the first embodiment.

FIG. 12 illustrates an example of the image for purpose A and various displays used for the user to perform the individual processing operation in this embodiment. A method for a display is not particularly limited, but in this embodiment, a display similar to the display illustrated in FIG. 7A when the original image is displayed in step S200 of common processing (step S102 of FIG. 3, and FIG. 6) is performed. In the example illustrated in FIG. 12, a type of processing and an image 70A for purpose A are displayed. Further, in one example illustrated in FIG. 12, icons according to various processing operations used for the user to select a type of individual processing operation are displayed in a processing operation selection portion 76. Icons for selecting, for example, rotation, movement, enlargement, trimming, and a histogram representing concentration, luminance, or the like are displayed in the processing operation selection portion 76 in the example illustrated in FIG. 12. The user selects the processing operation that is individual processing from the processing operation selection portion 76 using the operation panel 38, and performs the processing operation on the image 70A for purpose A. A degree (parameter) of the processing operation performed by the user is displayed in a parameter display portion 78. Further, a processing operation (individual processing operation) performed by the user is not limited to the example illustrated in FIG. 12.

In the console 20 of this embodiment, in the individual processing, a type of individual processing operation may be set by the user, similar to the common processing. In the console 20 of this embodiment, by storing the setting of the type of individual processing operation in a setting storage unit (not illustrated) provided in the control unit 30, the setting of the type of individual processing operation is performed. In a case in which the setting of the type of individual processing operation is performed, a mark 76B indicating a processing operation set as the individual processing operation may be displayed, as in the example illustrated in FIG. 7B described in the common processing. Further, for example, only the set individual processing operations may be displayed, as illustrated in FIG. 12.

The user performs a processing operation which is an individual processing operation according to the display of which the example is illustrated in FIG. 12. For example, a processing operation such as a change in concentration, or addition of a mark and a comment to a structure of interest for an image created in order to locate a specific structure is performed.

Then, in step S310, the control unit 30 determines whether or not reception of the individual processing operation has started. In this embodiment, for example, in a case in which the processing operation is selected in the processing operation selection portion 76 and any operation is performed on the image 70A for purpose A, the control unit 30 determines that the individual processing operation has been received. A specific example thereof may include a case in which the reception of the individual processing operation is determined to have started in a case in which an indication by the mouse of the operation panel 38 is detected on the image 70A for purpose A. The control unit 30 becomes a standby state in a case in which the individual processing operation is not received and proceeds to step S312 in a case in which the individual processing operation is received.

In step S312, the control unit 30 performs image processing corresponding to the individual processing operation on the image 70A for purpose A, and displays the image 70A for purpose A subjected to the image processing on the display 34. That is, the images corresponding to the individual processing operations performed by the user are sequentially generated, and sequentially displayed in place of the image 70A for purpose A of the display 34 illustrated in FIG. 12.

Then, in step S314, the control unit 30 determines whether or not the individual processing operation has ended. A specific example thereof may include a case in which in a case in which the control unit 30 detects the start of reception of the individual processing operation in response to an indication of the mouse of the operation panel 38 by the user, the control unit 30 determines a time point of button-up to be end of the individual processing operation. In a case in which the individual processing operation has not ended, the control unit 30 returns to step S312 to repeat the processing. On the other hand, in a case in which the individual processing operation has ended, the control unit 30 proceeds to step S316.

In step S316, the control unit 30 determines whether or not all of the individual processing operations performed by the user have ended. In this embodiment, in a case in which the control unit 30 detects that the end button 74 displayed on the display 34 illustrated in FIG. 12 has been instructed by the user, the control unit 30 determines that the individual processing operations have ended. In a case in which the individual processing operations have not ended, the control unit 30 returns to step S310 and repeats the respective processes of steps S310 to S314 for the new individual processing operation. On the other hand, in a case in which the control unit 30 detects that the end button 74 is instructed by the user, the control unit 30 proceeds to step S318.

Figure 13:
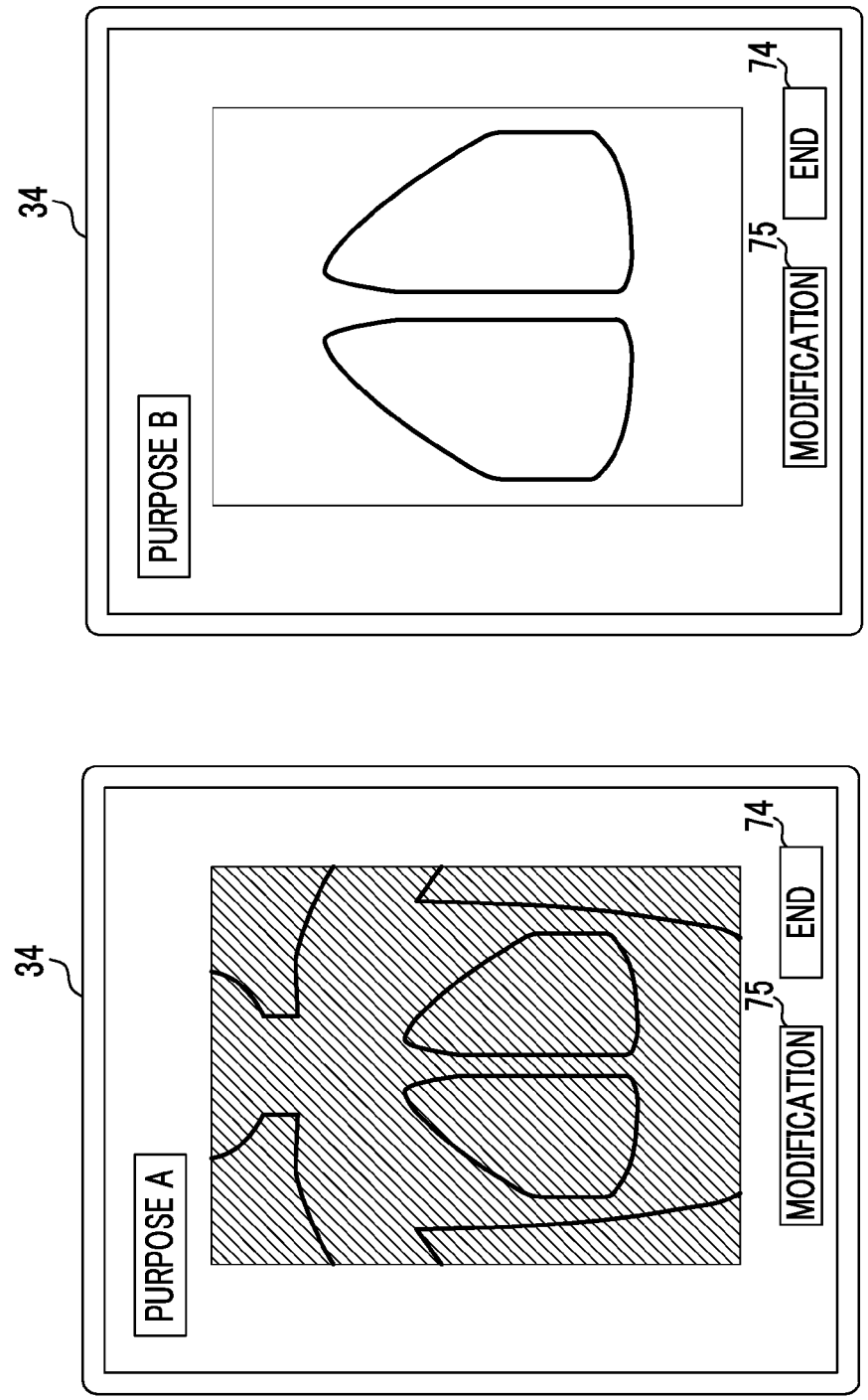
FIG. 13A is an illustrative diagram illustrating an example of a display of the purpose A image for confirmation in the first embodiment.
FIG. 13B is an illustrative diagram illustrating an example of a display of a purpose B image for confirmation in the first embodiment.

In this embodiment, since the generation of the purpose A image ends due to the end of the individual processing (purpose A), the control unit 30 displays the purpose A image on the display 34 to cause the user to confirm the purpose A image in step S318. FIG. 13A illustrates an example of a display of the purpose A image for confirmation in this embodiment. In the example illustrated in FIG. 13A, the purpose A image, an end button 74, and a modification button 75 are displayed. In the console 20 of this embodiment, the control unit 30 detects that the end button 74 is instructed to complete generation of the purpose A image. Further, in a case in which the console 20 in this embodiment detects that the modification button 75 has been instructed, the console 20 performs respective processes of steps S310 to S316 again and performs modification of the purpose A image.

The control unit 30 proceeds to step S320 in a case in which the control unit 30 detects that the end button 74 is instructed. In step S320, the control unit 30 stores the image information of the purpose A image and processing content of processing (including the image analysis process, the common processing, and the individual processing) performed for generation of the purpose A image in the storage unit of the control unit 30 in association with each other, and then ends this individual processing (purpose A). A method of storing the image information of the purpose A image and the processing content is not particularly limited. For example, the storage may be performed in the same manner as in step S208 of the common processing (FIG. 6). Further, for example, the processing content of the individual process and the image for purpose A may be stored.

In a case in which an output destination of the purpose A image generated through the image processing (purpose A) is determined in advance or designated by the user, the image for purpose A may be output to the output destination (for example, the radiographic image processing device 50 or the radiographic image interpretation device 52 of the PACS 22).

Further, in the image processing according to the application form of this embodiment, if the individual processing (purpose A) is first performed, then the individual process (purpose B) is performed to generate a purpose B image. The individual processing (purpose B) is similar to the individual processing (purpose A). "A" in the individual processing (purpose A) may be changed into "B", and the process of each step is the same as that for the individual processing (purpose A). Individual processing performed by the user in the individual processing (purpose B) is not particularly limited, and may be a processing operation of the same type as that of the individual processing (purpose A). Specific examples thereof may include trimming of the image, adjustment of image processing parameters suitable for diagnosis of a doctor or the like who is the user, and the like. FIG. 13B illustrates an example of a display of the purpose B image for confirmation in the individual processing (purpose B) of this embodiment. It is understood that in a case in which the individual processing (purpose B) is first performed, the individual processing (purpose A) is then performed to generate the purpose A image.

Figure 14:
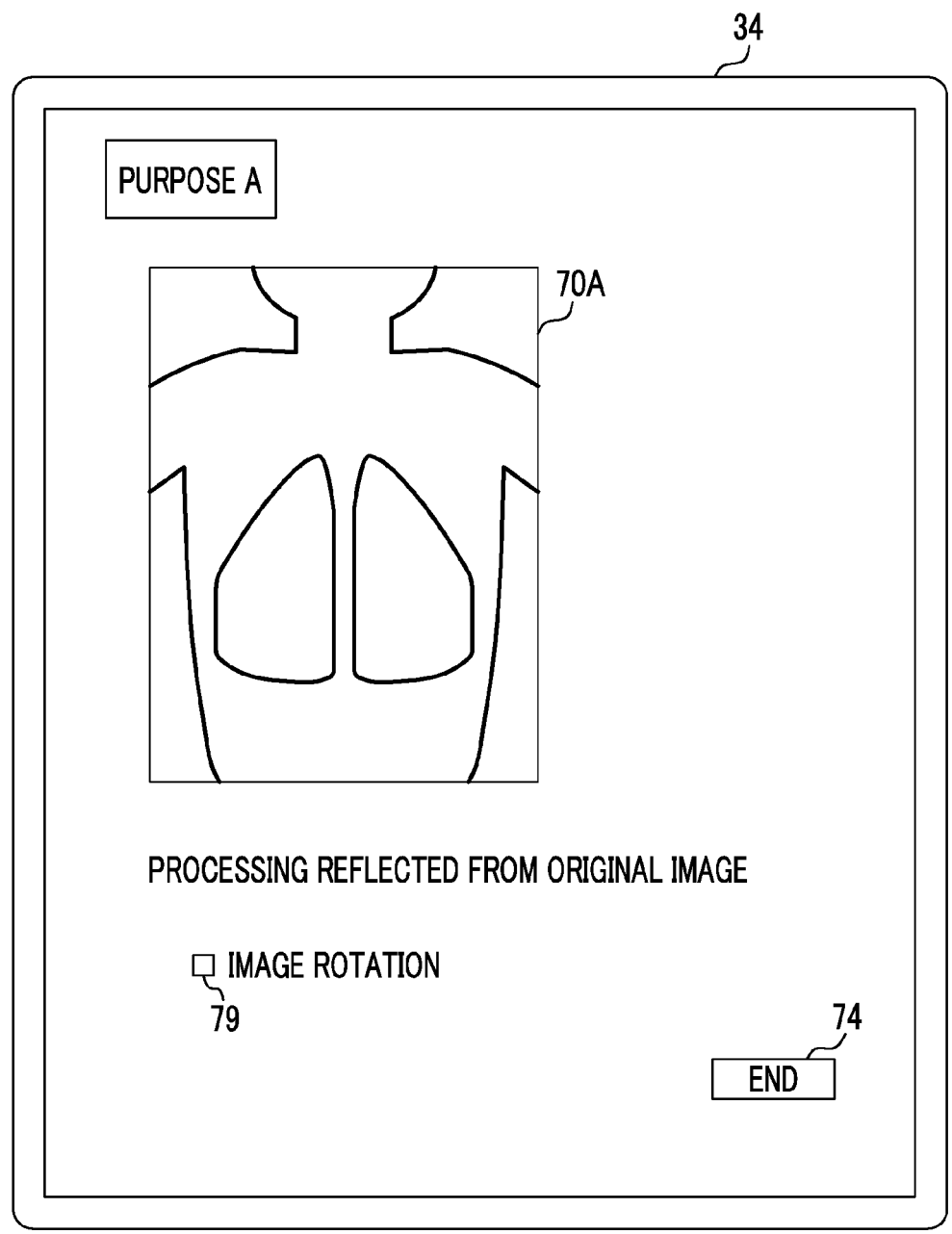
FIG. 14 is an illustrative diagram for describing a display indicating common processing reflected upon generation of the image for purpose A in the first embodiment.

While the common processing is all reflected in the individual processing (purpose A) and the individual processing (purpose B) according to the application form of this embodiment, the common processing may not be all reflected. For example, in step S308, a display indicating common processing reflected upon generation of the image 70A for purpose A may be performed as illustrated in FIG. 14, before a display of the image 70A for purpose A and various displays (see FIG. 12) used for the user to perform the individual processing operation are performed. In a case in which the display illustrated in FIG. 14 is performed, the user can change processing to be changed by confirming the displayed image 70A for purpose A and checking a check box 79 of the common processing of which no reflection is determined to be good. In a case in which the console 20 detects that the check box 79 is checked, the console 20 may repeat a process of reflecting the common processing in step S306 according to content of the check.

[Second Embodiment]

Since a radiographic image capturing system 10, a console 20, and a PACS 22 in this embodiment have substantially the same configuration and operation as the radiographic image capturing system 10, the console 20, and the PACS 22 of the first embodiment, detailed description of the same units is omitted.

Since the configurations of the radiographic image capturing system 10, the console 20, and the PACS 22 are the same as those in the first embodiment, description thereof is omitted in this embodiment.

Figure 15:
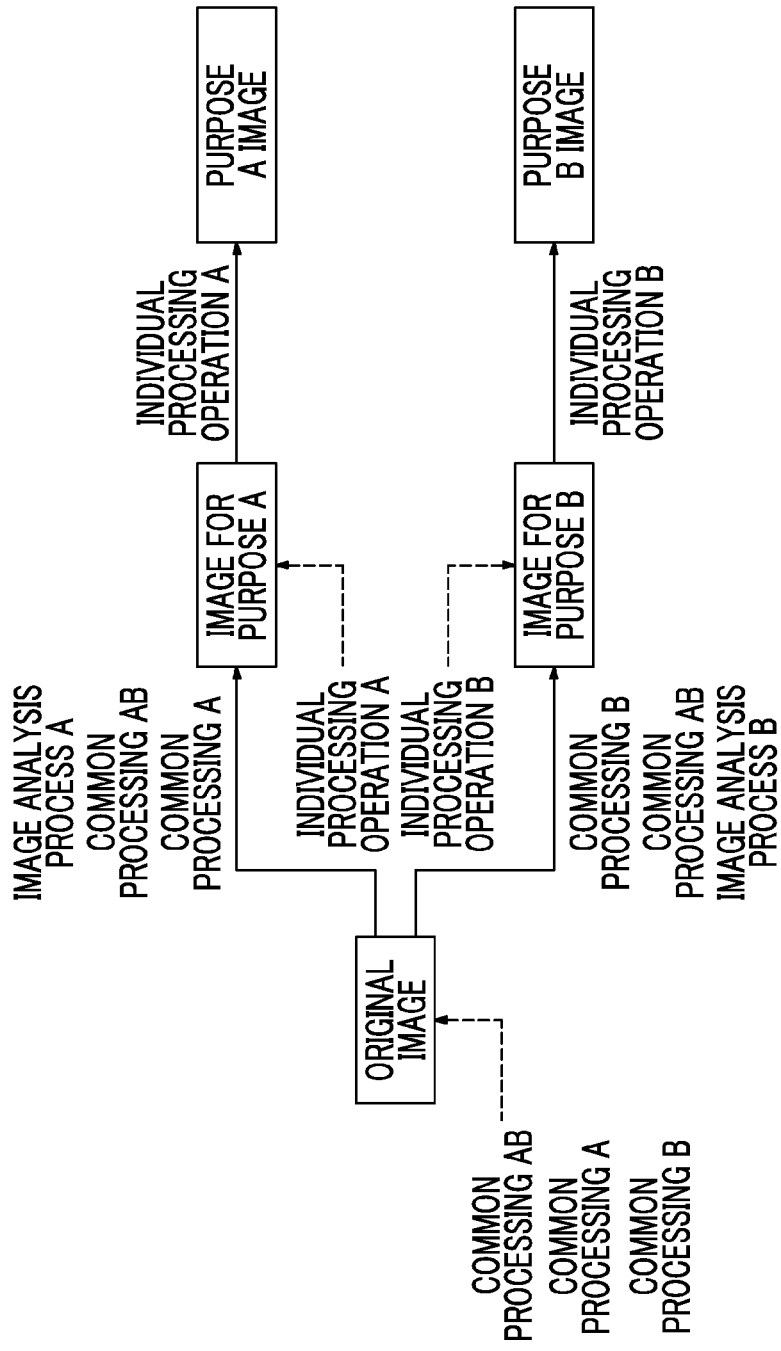
FIG. 15 is an illustrative diagram illustrating an example of a flow of image processing (processing operation) in a console of a second embodiment.

FIG. 15 illustrates an example of a flow of image processing (processing operation) in the console 20 of this embodiment. As illustrated in FIG. 15, the image processing of this embodiment is the same as that in the first embodiment (see FIG. 5) in that the common processing is performed, and then, each individual processing is performed. The image processing of this embodiment is different from the image processing of the first embodiment in that three types of common processing including common processing AB, common processing A that is in common only for purpose A, and common processing B that is in common only for purpose B, which are the same as those in the first embodiment, are performed on the original image.

Figure 16:
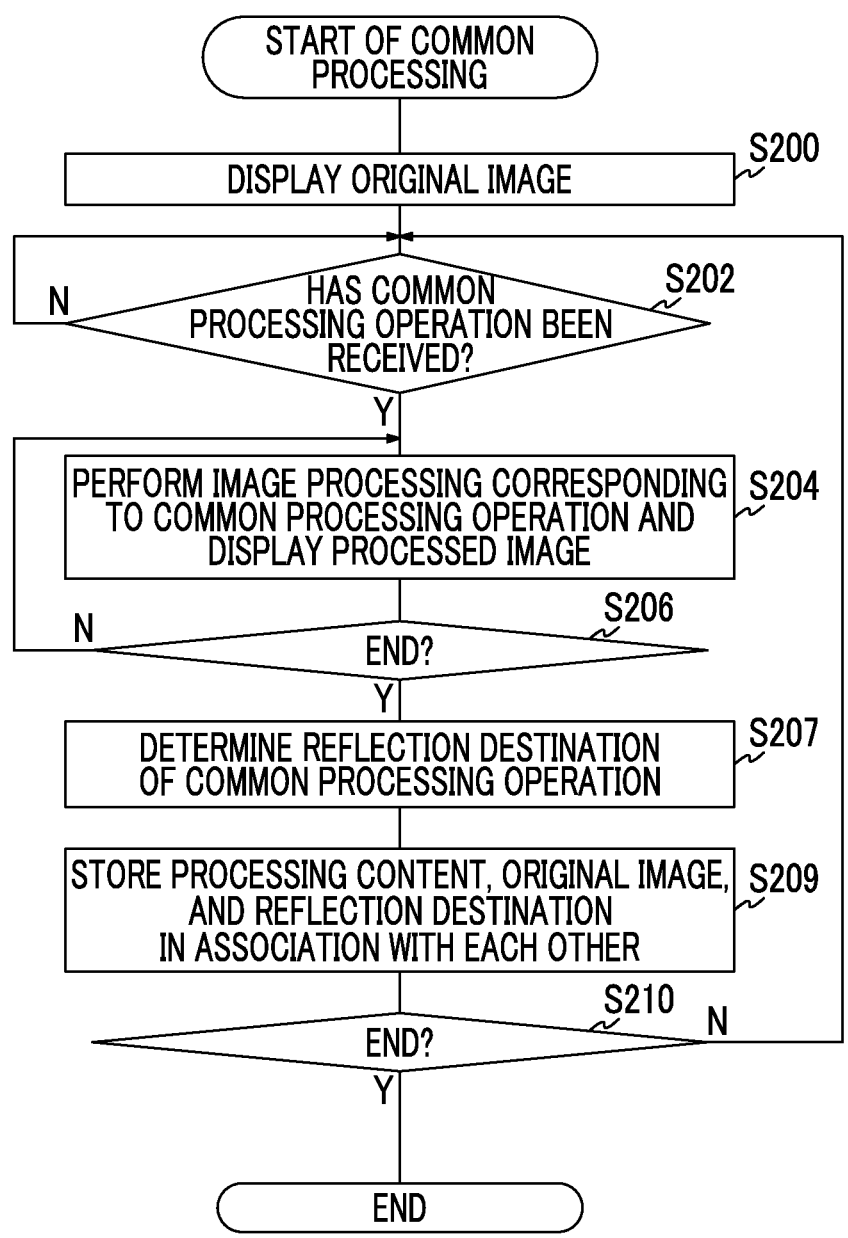
FIG. 16 is a flowchart of an example of common processing executed in image processing in the second embodiment.

Since a flow of entire image processing executed by the console 20 in this embodiment is the same as that in the first embodiment (see FIG. 3), detailed description is omitted and the common processing of the embodiment will be described in detail. FIG. 16 illustrates a flowchart of an example of common processing executed in the image processing of this embodiment.

In step S200, the original image is acquired and displayed on the display 34, similar to step S200 of the common processing in the first embodiment. In this embodiment, various displays used for the user to perform a common processing operation on the original image are displayed on the display 34 together with the original image, but a portion of display content is different from that in the first embodiment.

Figure 17:
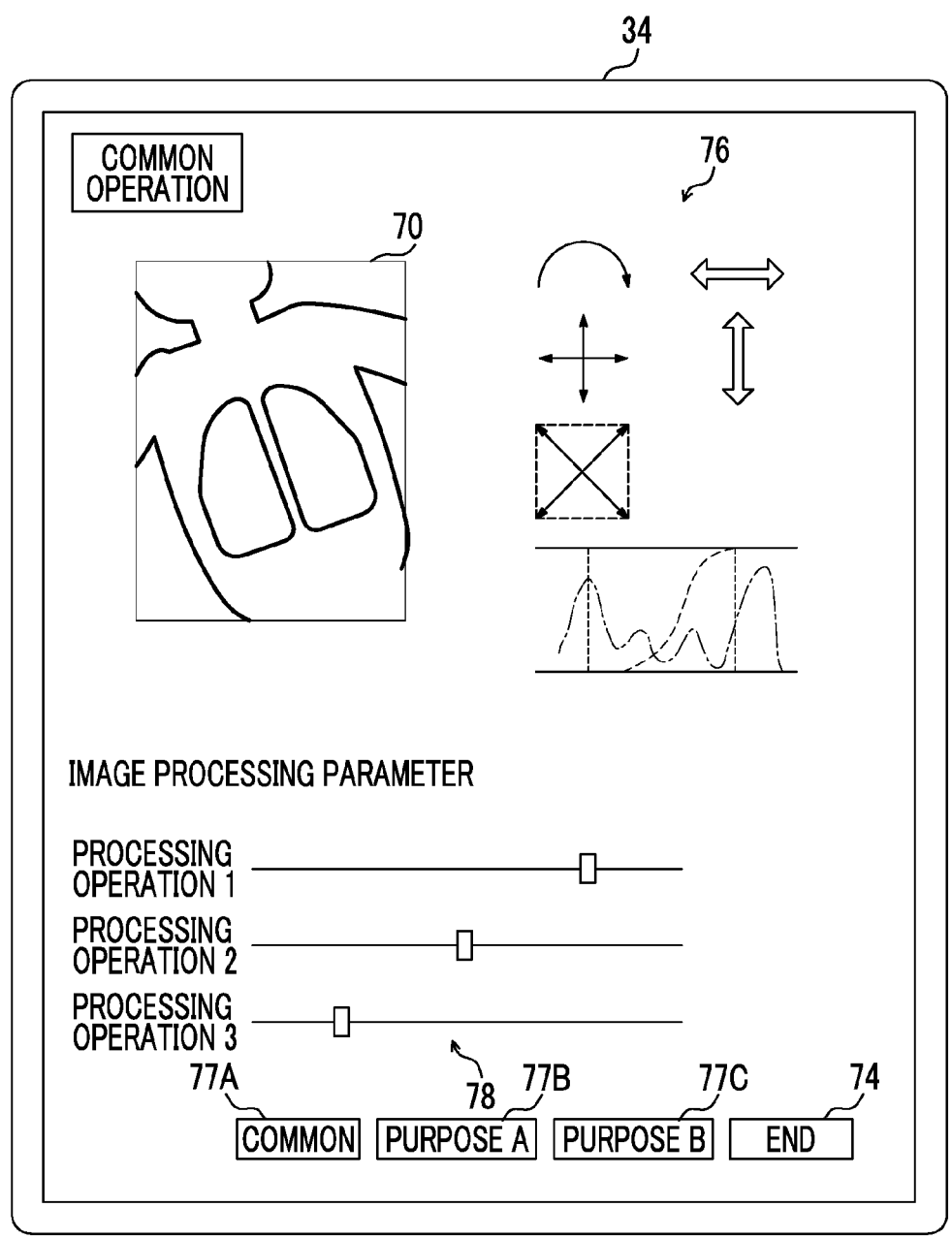
FIG. 17 is an illustrative diagram illustrating a specific example of an original image and various displays used for a user to perform a common processing operation in the second embodiment.

FIG. 17 illustrates a specific example of an original image and various displays used for a user to perform a common processing operation in this embodiment. In the example illustrated in FIG. 17, a type of processing, an original image 70, and a processing operation selection portion 76 are displayed. Further, in this embodiment, a common button 77A, a purpose A button 77B, and a purpose B button 77C are displayed in addition to an end button 74.

In respective processes of next steps S202 to S206 of the common processing of this embodiment, a common processing operation is received, image processing corresponding to the common processing operation is performed, the processed image is displayed on the display 34, and it is determined whether the common processing operation has ended, as in the first embodiment. In this embodiment, there are three types of common processing, as described above. Therefore, the user indicates a type of common processing operation operated before the common processing operation or after the common processing operation using any one of the common button 77A, the purpose A button 77B, and the purpose B button 77C. Specifically, in the case of common processing AB, the user indicates the common button 77A. Further, in the case of common processing A, the user indicates the purpose A button 77B. In the case of common processing B, the user indicates the purpose B button 77C. Either before the common processing operation or after the common processing operation when the type of common processing is indicated may be determined in advance.

In a case in which a type of common processing corresponding to the processing operation is set in advance, the indication of the type of common processing may not be performed by the user. In a case in which the type is set in advance, the same display as in FIG. 7A described in the first embodiment may be performed in place of the display illustrated in FIG. 17.

Further, in this embodiment, in a case in which the common processing operation is set in advance, a mark 76B indicating a processing operation not set as a common processing operation may be displayed, as in FIG. 7B in the first embodiment.

In the common processing of this embodiment, in a case in which the control unit 30 determines that the common processing operation has ended in step S206, the control unit 30 proceeds to step S207.

In step S207, the control unit 30 determines a reflection destination of the common processing operation. In this embodiment, since the type of common processing is indicated as described above, the reflection destination is determined based on the indication.

Then, in step S209, the control unit 30 stores processing content of the received common processing operation, the original image, and the reflection destination in the storage unit of the control unit 30 in association with each other. A method of associating the processing content with the original image may be the same as in the first embodiment.

Then, in step S210, the control unit 30 determines whether or not the common processing operations of the user have all been ended, as in the first embodiment. In a case in which the common processing operations have not ended, the control unit 30 returns to step S202 and repeats the respective processes of steps S202 to S209 for a new common processing operation. On the other hand, in a case in which the control unit 30 has detected that the end button 74 has been indicated by the user, the control unit 30 ends this common processing.

Individual processing (purpose A) and individual processing (purpose B) performed after the common processing are substantially the same as those in the application form of the first embodiment (see FIG. 10). In this embodiment, in step S306 of the individual processing (purpose A), the control unit 30 reflects both common processing AB and common processing A. Further, it is understood that, in step S306 of the individual processing (purpose B), the control unit 30 reflects both common processing AB and common processing B.

[Third Embodiment]

Since a radiographic image capturing system 10, a console 20, and a PACS 22 in this embodiment have substantially the same configuration and operation as the radiographic image capturing system 10, the console 20, and the PACS 22 of the first embodiment, detailed description of the same units is omitted.

Since the configurations of the radiographic image capturing system 10, the console 20, and the PACS 22 are the same as those in the first embodiment, description thereof is omitted in this embodiment.

Figure 18:
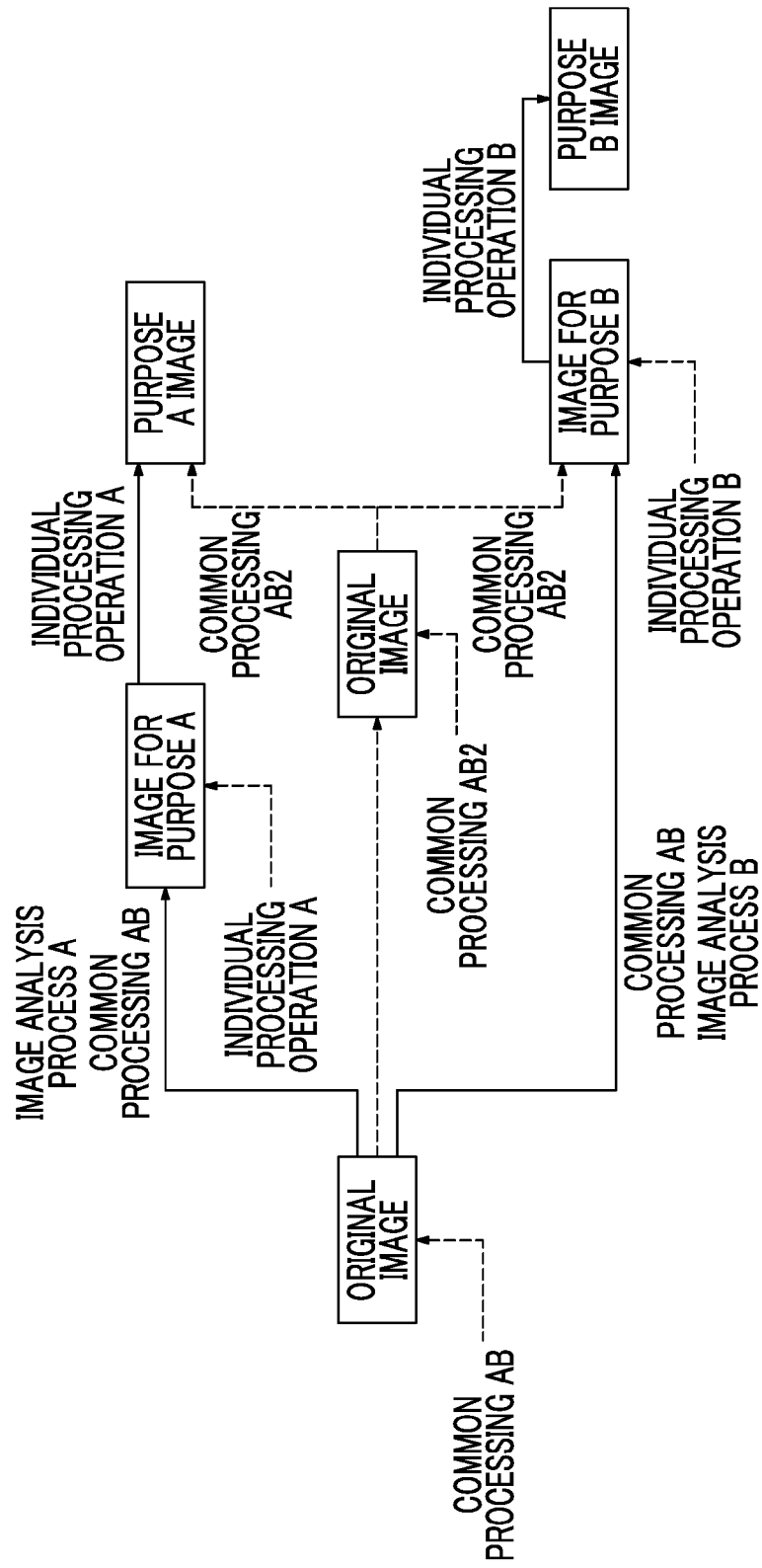
FIG. 18 is an illustrative diagram illustrating an example of a flow of image processing (processing operation) in a console of a third embodiment.

FIG. 18 illustrates an example of a flow of image processing (processing operation) in the console 20 in this embodiment. As illustrated in FIG. 18, in the image processing of this embodiment, after the common processing is performed, the common processing (hereinafter referred to as "re-common processing") is performed on the original image again. A case in which the re-common processing is performed may include, for example, a case in which fine adjustment of the first performed common processing is performed or a case in which additional common processing is performed. In the image processing of this embodiment, timing of the re-common processing is not particularly limited.

As a specific example, FIG. 18 illustrates a flow of image processing in a case in which individual processing (purpose A) according to an application form of the first embodiment is performed prior to individual processing (purpose B), and re-common processing is performed during individual processing (purpose A). In the specific example illustrated in FIG. 18, in a case in which the control unit 30 desires to perform re-common processing during performing of the individual processing (purpose A) of step S106, the control unit 30 may end individual processing (purpose A) in step S106, and then, perform common processing of step S102 as re-common processing again via the respective processes of steps S110 and S100. In the image processing of this embodiment, the process of step S102 to be first performed, and the process of step S102 to be performed as re-common processing are the same as the common processing (see FIG. 6) of step S102 in the image processing of the first embodiment. In this embodiment, the common processing performed in the re-common processing is referred to as "common processing AB2".

Further, after ending the re-common processing, the control unit 30 may execute the individual processing (purpose A) of step S106 via the respective processes of steps S110, S100, and S104 again so that the individual processing operation A is performed again.

In a case in which the common processing, the re-common processing, and the individual processing (purpose A) are performed, and then, the individual processing (purpose B) is performed, image analysis process B is performed on the original image, and an image in which common processing AB and common processing AB2 have been reflected is generated as an image for purpose B.

Further, for example, the re-common processing is not limited to the timing illustrated in FIG. 18 and may be performed between the common processing and each individual processing (individual processing (purpose A) and individual processing (purpose B)). In a case in which the re-common processing is performed before each individual processing, the control unit 30 may perform common processing in step S102 as re-common processing again without performing the respective processes of steps S104 to S108 after ending step S102 of the image processing illustrated in FIG. 3.

In a case in which at least one of the individual processing (purpose A) and the individual processing (purpose B) end, and then, the re-common processing is performed, the re-common processing may be reflected in the purpose A image or the purpose B image which has been generated through each individual processing and stored.

[Fourth Embodiment]

Since a radiographic image capturing system 10, a console 20, and a PACS 22 in this embodiment have substantially the same configuration and operation as the radiographic image capturing system 10, the console 20, and the PACS 22 of the first embodiment, detailed description of the same units is omitted.

Since the configurations of the radiographic image capturing system 10, the console 20, and the PACS 22 are the same as those in the first embodiment, description thereof is omitted in this embodiment.

Figure 19:
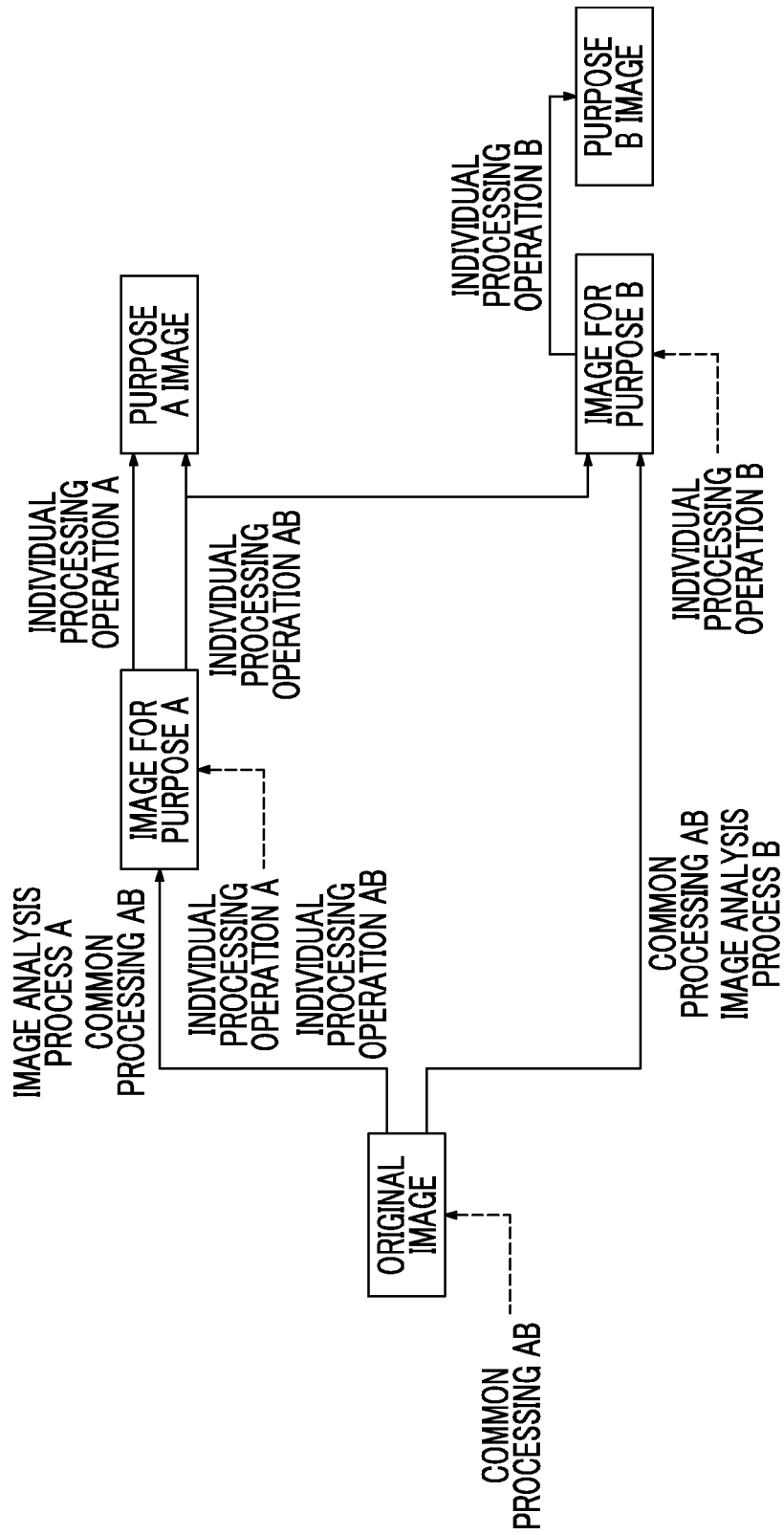
FIG. 19 is an illustrative diagram illustrating an example of a flow of image processing (processing operation) in a console of a fourth embodiment.

FIG. 19 illustrates an example of a flow of image processing (processing operation) in the console 20 of this embodiment. As illustrated in FIG. 19, in the image processing of this embodiment, the common processing is performed, and then, the individual processing operation performed in the individual processing performed for generation of the image for one purpose can be handed over to the individual processing performed for generation of the image for the other purpose, unlike the application form of the first embodiment. A case in which the individual processing operation is handed over may include, for example, a case in which individual processing is handed over as common processing, such as a case in which fine adjustment of the first performed common processing is performed or a case in which additional common processing is performed. The control unit 30 of the console 20 in this embodiment corresponds to an example of the handover unit.

As a specific example, FIG. 19 illustrates a flow of image processing in a case in which individual processing (purpose A) is performed prior to individual processing (purpose B), and an individual processing operation (hereinafter referred to as "individual processing operation AB") performed in individual processing (purpose A) is handed over to individual processing (purpose B).

Since an entire flow of image processing of this embodiment is the same as that in the first embodiment (see FIG. 3), common processing (FIG. 6) in the image processing is also the same as that in the first embodiment, detailed description thereof is omitted.

Since a flow of the entire image processing and the common processing executed by the console 20 in this embodiment is the same as that in the first embodiment (see FIG. 3), detailed description will be omitted. In this embodiment, since the individual processing (purpose A) and the individual processing (purpose A) according to the application form of the first embodiment are different from each other, the individual processing (purpose A) will be described in detail. The individual processing (purpose B) of this embodiment is the same as the individual processing (purpose A) of this embodiment, "purpose A" in the individual processing (purpose A) may be changed into "purpose B", and the process of each step in individual processing (purpose B) is the same as in the individual processing (purpose A).

Figure 20:
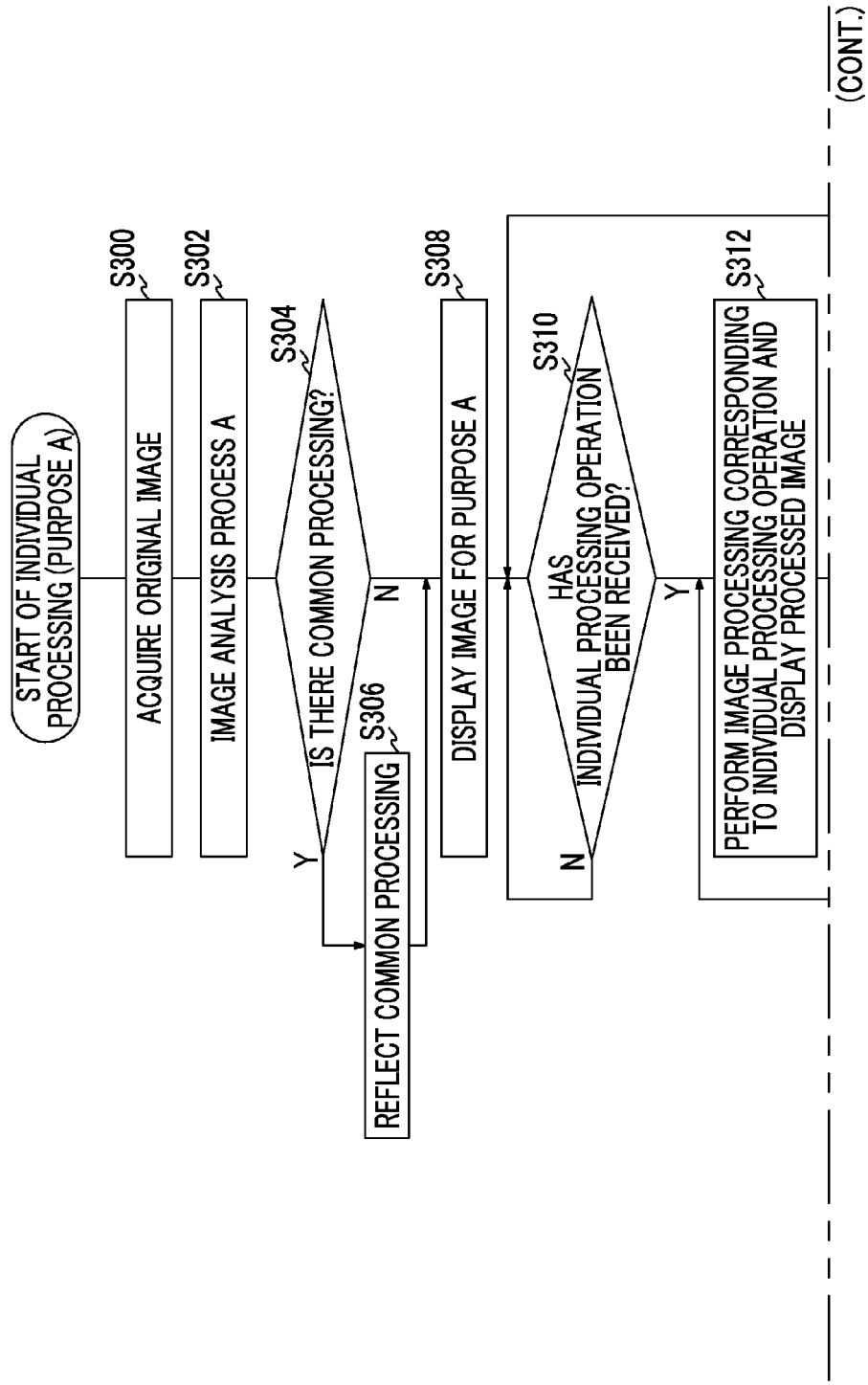
FIG. 20 is a flowchart of an example of individual processing (purpose A) performed in image processing in the fourth embodiment.

FIG. 20 illustrates a flowchart of an example of individual processing (purpose A) performed in the image processing of this embodiment. A process of each of steps S300 to S314 is the same as the process of each of steps S300 to S314 of the individual processing (purpose A) according to the application form of the first embodiment. In the individual processing (purpose A) of this embodiment, through the respective process of steps S300 to S306, the control unit 30 acquires an original image, displays the original image on the display 34, and performs image analysis process A on the original image. Further, the control unit 30 determines whether or not there is common processing. In a case in which there is common processing, the control unit 30 reflects processing content of the common processing operation in the original image subjected to image analysis process A to generate an image for purpose A.

Then, in step S308, the control unit 30 displays, on the display 34, various displays used for the user to perform an individual processing operation on the image for purpose A together with the image for purpose A, but a portion of the display content is different from that in the first embodiment.

Figure 21:
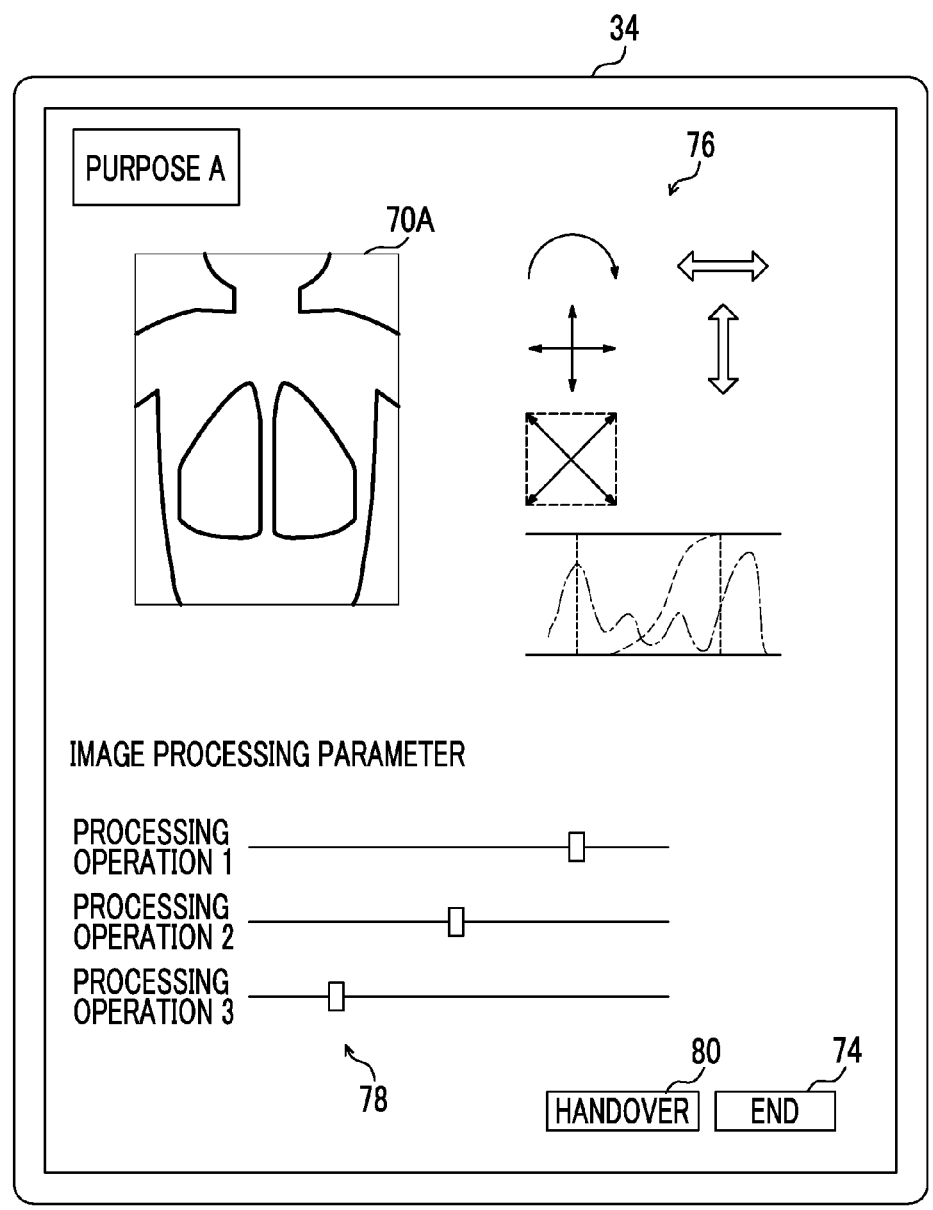
FIG. 21 is an illustrative diagram illustrating a specific example of an image for purpose A and various displays used for a user to perform an individual processing operation in the fourth embodiment.

FIG. 21 illustrates a specific example of the image for purpose A and various displays used for the user to perform the individual processing operation in this embodiment. In the example illustrated in FIG. 21, a type of processing, an image 70A for purpose A, and a processing operation selection portion 76 are displayed. Further, in this embodiment, a handover button 80 is displayed in addition to an end button 74.

In respective processes of next steps S310 to S314 of the individual processing (purpose A) of this embodiment, the individual processing operation is received, image processing according to the individual processing operation is performed, the processed image is displayed on the display 34, and it is determined whether the individual processing operation has ended, as in the application form of the first embodiment. In this embodiment, the individual processing operation performed in individual processing (purpose A) can be handed over to the individual processing (purpose B) as the common processing operation, as described above. Therefore, the user indicates the handover button 80 before the individual processing operation handed over as the common processing operation or after the individual processing operation to indicate that the individual processing operation is handed over as the common processing operation. Any one of before the individual processing operation and after the individual processing operation in a case in which the indication is performed may be determined in advance.

In a case in which the type of individual processing operation to be handed over as the common processing operation has been set in advance, an instruction of the handover by the user may not be performed. In a case in which the type has been set in advance, the same display as in FIG. 7A described in the first embodiment may be performed in place of the display illustrated in FIG. 21.

In the individual processing (purpose A) of this embodiment, the control unit 30 proceeds to step S315-1 in a case in which the control unit 30 determines that the individual processing operation has ended in step S314.

In step S315-1, the control unit 30 determines whether or not the individual processing operation is handed over to the individual processing (purpose B). In a case in which the control unit 30 of this embodiment detects an indication of the handover button 80, the control unit 30 determines that the individual processing operation is handed over, as described above. In a case in which the type of common processing operation has been set, the common processing operation not performed by the user in the common processing operation in the set common processing operation may not be handed over to individual processing of the other image even in a case in which such a common processing operation is performed during the individual processing. By doing so, it is possible to prevent an unintended processing operation from being handed over as the common processing operation. The control unit 30 proceeds to step S316 in a case in which the individual processing operation is not handed over, and to step S315-2 in a case in which the individual processing operation is handed over.

In step S315-2, the control unit 30 stores processing content of the individual processing operation in the storage unit 54 or the storage unit 64 in association with the purpose B which is a handover destination, and then, proceeds to step S316. An association and storage method is not particularly limited.

In each of the processes of next steps S316 to S320, the control unit 30 determines whether or not the individual processing operations of the user have all ended, and displays the purpose A image on the display 34 to cause the user to confirm the purpose A image in a case in which the individual processing operations have ended, as in the application form of the first embodiment. Further, the control unit 30 stores the image information of the purpose A image and processing content of processing (including the image analysis process, the common processing, and the individual processing) performed for generation of the purpose A image in the storage unit of the control unit 30 in association with each other, and then ends this individual processing (purpose A).

[Fifth Embodiment]

Since a radiographic image capturing system 10, a console 20, and a PACS 22 in this embodiment have substantially the same configuration and operation as the radiographic image capturing system 10, the console 20, and the PACS 22 of the first embodiment, detailed description of the same units is omitted.

Since the configurations of the radiographic image capturing system 10, the console 20, and the PACS 22 are the same as those in the first embodiment, description thereof is omitted in this embodiment.

In the third embodiment and the fourth embodiment, even after the start of the individual processing (purpose A) or the individual processing (purpose B), the common processing operation (including a case in which the individual processing operation performed as a common processing operation is performed) is performed. On the other hand, in the image processing of this embodiment, in a case in which the individual processing (purpose A) or the individual processing (purpose B) is performed, the common processing operation is prohibited. The control unit 30 of this embodiment corresponds to an example of a prohibition unit.

Figure 22:
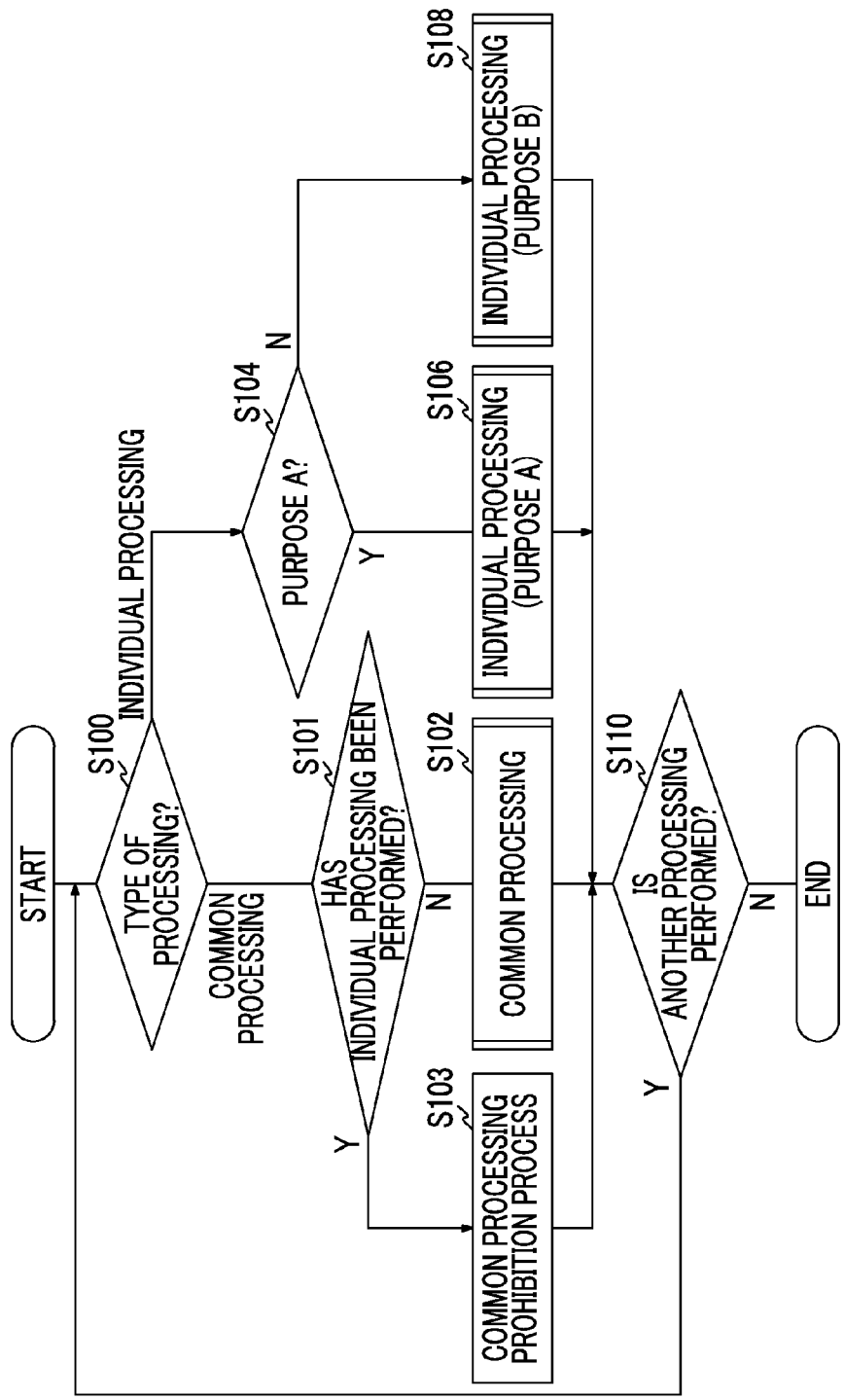
FIG. 22 is a flowchart illustrating an entire flow of an example of image processing executed by the control unit of the console in a fifth embodiment.

FIG. 22 illustrates a flowchart illustrating an entire flow of an example of image processing executed by the control unit 30 of the console 20 in this embodiment.

A process of step S100 is the same as the process of step S100 of the common processing in the first embodiment. In the image processing of this embodiment, a type of processing is selected. Since each of processes of steps S104 to S108 performed in a case in which the control unit 30 determines in step S100 that the type of processing is individual processing is the same as each of the processes of steps S104 to S108 of the first embodiment, detailed description thereof will be omitted.

Meanwhile, in a case in which the control unit 30 determines that the type of processing is common processing in step S100 of this embodiment, the control unit 30 proceeds to step S101, unlike the first embodiment. In step S101, the control unit 30 determines whether or not the individual processing has been performed. In a case in which any of the individual processing (purpose A) and the individual processing (purpose B) has not been performed, the control unit 30 proceeds to step S102 and performs common processing, as in the first embodiment. On the other hand, in a case in which at least one of the individual processing (purpose A) and the individual processing (purpose B) has already been performed, the control unit 30 proceeds to step S103.

In step S103, the control unit 30 performs a common processing prohibition process, and then, proceeds to step S110. The common processing prohibition process is a process to be performed when the common processing is to be prohibited, may be determined in advance, and is not particularly limited. An example thereof may include a process in which the control unit 30 displays an indication showing the common processing is prohibited, on the display 34.

As described above, in this embodiment, by providing the respective processes of steps S101 and S103, the common processing can be repeatedly performed until any one of the individual processing is performed, but in a case in which at least one of the individual processing is performed, the common processing operation can be prohibited.

As described above, in the basic form of the present invention, the control unit 30 of the console 20 first performs the common processing operation on the original image. The control unit 30 sets the original image subjected to common processing to the image for purpose A and performs individual processing (purpose A) to generate the purpose A image. Further, the control unit 30 sets the original image subjected to common processing as the image for purpose B, and performs individual processing (purpose B) to generate a purpose B image.

Further, since the control unit 30 of the console 20 of each embodiment first acquires the original image of the radiographic image acquired from the radiographic image capturing device 12 in order to perform a common processing operation, as described above. The control unit 30 detects the common processing operation performed on the original image by the user and stores processing content of the common processing operation and the original image in association with each other. Then, in a case in which the processing transitions to individual processing (purpose A) for generating the purpose A image, the control unit 30 performs image analysis process A on the acquired original image and reflects the common processing to generate the purpose A image. Further, the control unit 30 detects the individual processing operation performed on the image for purpose A by the user and performs image processing corresponding to the individual processing operation to generate the image for purpose A. Similarly, in a case in which the processing transitions to individual processing (purpose B) for generating the purpose B image, the control unit 30 performs image analysis process B on the acquired original image and reflects the common processing to generate the purpose B image. Further, the control unit 30 detects the individual processing operation performed on the image for purpose B by the user and performs image processing corresponding to the individual processing operation to generate the purpose B image.

Further, the control unit 30 of the console 20 can perform the common processing after once performing the common processing by performing the common processing operation on the original image through the common processing or handing over the individual processing operation to individual processing of the image for the other purpose in each individual process.

Further, in a case in which at least one individual processing has been performed, the control unit 30 of the console 20 can inhibit the common processing operation.

Since the control unit 30 of the console 20 in each embodiment generates plural images having different purposes from one original image, it is possible to achieve reduction of an amount of exposure of the subject 18 and reduction of restraint time. Further, it is possible to achieve suppression of degradation of a bulb which is a radiation irradiation source of the radiation irradiation device 16 or reduction of imaging work of the radiological technician.

Further, since the control unit 30 of the console 20 of each embodiment can reflect the common processing operation performed on the original image by the user in each of plural images having different purposes, it is possible to reduce time and effort required to perform the processing operation (individual processing operation) image by image, and reduce a load of the processing operation of a user. Since the same processing operation is reflected as the common processing operation, a processing operation desired to be similarly performed on the images for both purposes does not require fine adjustment, and accordingly, the load of processing operation is reduced.

Further, in the console 20 of this embodiment, the user can set the common processing operation to be performed on the original image. Therefore, in a case in which the processing operation (individual processing operation) is performed on each of plural images having different purposes, it is possible to prevent the processing operation not desired by the user from being reflected and prevent repetition of the processing operation from occurring.

In a case in which individual processing (purpose A) and individual processing (purpose B) are performed after the common processing is performed in each embodiment, the individual processing may be performed prior to the common processing in a case in which the common processing is not prohibited from being performed after each individual processing.

Further, the image for one purpose may be switched to the image for the other purpose according to an instruction of the user while the individual processing operation of the image for one purpose is being executed, and the individual processing operation may be performed on the other image, or displays of both of the images and individual processing operations may be switched to each other and performed. In a case in which both of the images are switched to each other and the displays and the processing operations are performed, content of the processing operation (including the image analysis process) for each image may be stored in association with both images. Further, in this case, the original image and the content of the processing operation for each image (including the image analysis process) may be stored in association with each other.

Further, while the case in which the type of the common processing operation or the processing operations of individual processing (purpose A) and individual processing (purpose B) can be set has been described in each embodiment, a non-set type of processing operation may be prohibited in a case in which the type of processing operation has been set.

While the case in which the control unit 30 of the console 20 performs the image processing has been described in each embodiment, another device may perform all or some of the image processing. For example, the control unit 60 of the radiographic image processing device 50 of the PACS 22 may perform the image processing.

Further, in each embodiment, the image information of the purpose A image and the content of the image processing (including the image analysis process) performed for generation of the purpose A image are stored in association with each other, and the image information of the purpose B image and the content of the image processing (including the image analysis process) performed for generation of the purpose B image are stored in association with each other. In addition thereto, the image information and the content may also be stored in association with the original image. Further, the image information of the purpose A image and the image information of the purpose B image may not be stored, and the original image, content of the image processing (including the image analysis process) performed for generation of the purpose A image, and content of the image processing (including the image analysis process) performed for generation of the purpose B image may be stored in association with each other.

Further, while the case in which the image processing program is stored in the control unit 30 of the console 20 in advance has been described in each embodiment, the image processing program may be stored in a recording medium such as a compact disk read only memory (CD-ROM) or a universal serial bus (USB) memory, an external device, or the like.

Further, while the case in which two types of images are generated as plural images having different purposes has been described in each embodiment, three or more images may be generated.

Further, in this embodiment, the radiation of the present invention is not particularly limited, and X-rays, γ-rays, or the like can be applied.

Further, it is understood that configurations, operations, and the like of the radiographic image capturing system 10, the console 20, and the PACS 22 described in this embodiment are examples and can be changed according to circumstances without departing from the gist of the present invention.

The entire disclosure of Japanese Patent Application No. 2014-195140 is hereby incorporated herein by reference.

All documents, patent applications, and technical standards described herein are incorporated herein by references to the same extent as a case in which incorporation of the individual reference documents, patent applications, and technical standards by references are described specifically and individually.

What is claimed is:

1. An image processing device that generates a plurality of different images subjected to different image processing from an original image which is a radiographic image, the image processing device comprising:
   a common image generation unit that receives a common processing operation for the original image and performs common processing corresponding to the received common processing operation on the original image to generate an original image subjected to common processing;
   a first image generation unit that performs first image processing on the original image subjected to common processing to generate a first image;
   a second image generation unit that performs second image processing different from the first image processing on the original image subjected to common processing to generate a second image;
   a handover unit that hands over a handover individual processing operation to be handed over to an image different from an image processing target subjected to the first image processing or the second image processing, to the different image, in a case in which the first image processing or the second image processing includes the handover individual processing operation; and
   a setting unit that sets the common processing operation, wherein in a case in which the handover individual processing operation is the same as the common processing operation set by the setting unit and is a common processing operation that is not received, the handover unit does not hand over the handover individual processing operation to the different image.

2. The image processing device according to claim 1, further comprising:
   a prohibition unit that prohibits reception of the common processing operation after the image processing device receives an individual processing operation.

3. The image processing device according to claim 1, wherein, in a case in which the common image generation unit receives a re-common processing operation for the original image subjected to common processing, the common image generation unit reflects the re-common processing operation in the first image and the second image.

4. An image processing system comprising:
   the image processing device according to claim 1;
   a display unit that displays an image subjected to image processing by the image processing device; and
   an operation unit that performs a processing operation for the image processing device.

5. A non-transitory computer readable medium storing an image processing program that causes a computer to function as each unit of the image processing device according to claim 1.

6. An image processing device comprising:
   a generation unit that generates a first image and a second image by performing image analysis processes having different processing conditions on an original image which is a radiographic image;
   a reception unit that receives one or more common processing operations for the original image;
   a reflecting unit that reflects the common processing operations received by the reception unit in the original image before the generation unit performs the image analysis processes having different processing conditions;
   an image processing unit that receives any one of first image processing for the first image and second image processing for the second image and performs the first received image processing or the second received image processing on the one image;
   a handover unit that hands over a handover individual processing operation to be handed over to an image different from an image processing target subjected to the first image processing or the second image processing, to the different image, in a case in which the first image processing or the second image processing includes the handover individual processing operation; and
   a setting unit that sets the common processing operation, wherein in a case in which the handover individual processing operation is the same as the common processing operation set by the setting unit and is a common processing operation that is not received, the handover unit does not hand over the handover individual processing operation to the different image.

7. The image processing device according to claim 6, further comprising:
a prohibition unit that prohibits reception of the common processing operation after the image processing device receives an individual processing operation.

8. The image processing device according to claim 6, wherein the reflecting unit further reflects a re-common processing operation in a case in which the reception unit receives a common processing operation as the re-common processing operation again after the reflecting unit reflects the common processing operation received by the reception unit.

9. The image processing device according to claim 6, wherein the reception unit receives only a common processing operation to be reflected in the first image and the second image.

10. The image processing device according to claim 6, wherein in a case in which the reflecting unit reflects the common processing operation in the first image and the second image, the reflecting unit selects a common processing operation to be reflected in each of the first image and the second image from among the common processing operations and reflects the common processing operation in each of the first image and the second image.

11. An image processing system comprising:
the image processing device according to claim 6;
a display unit that displays an image subjected to image processing by the image processing device; and
an operation unit that performs a processing operation for the image processing device.

12. A non-transitory computer readable medium storing an image processing program that causes a computer to function as each unit of the image processing device according to claim 6.

13. An image processing method of an image processing device that generates a plurality of different images subjected to different image processing from an original image which is a radiographic image, the image processing method comprising:
causing a common image generation unit to receive a common processing operation for the original image and perform common processing corresponding to the received common processing operation on the original image to generate an original image subjected to common processing;
causing a first image generation unit to perform first image processing on the original image subjected to common processing to generate a first image;
causing a second image generation unit to perform second image processing different from the first image processing on the original image subjected to common processing to generate a second image;
causing a handover unit to hand over a handover individual processing operation which is to be handed over to an image different from an image processing target subjected to the first image processing or the second image processing, to the different image, in a case in which the first image processing or the second image processing includes the handover individual processing operation; and
causing a setting unit to set the common processing operation,
wherein in a case in which the handover individual processing operation is the same as the common processing operation set by the setting unit and is a common processing operation that is not received, the handover unit does not hand over the handover individual processing operation to the different image.

14. An image processing method comprising:
causing a generation unit to generate a first image and a second image by performing image analysis processes having different processing conditions on an original image which is a radiographic image;
causing a reception unit to receive one or more common processing operations for the original image;
causing a reflecting unit to reflect the common processing operations received by the reception unit in the original image before the generation unit performs the image analysis processes having different processing conditions;
causing an image processing unit to receive any one of first image processing for the first image and second image processing for the second image and perform the first received image processing or the second received image processing on the one image;
causing a handover unit to hand over a handover individual processing operation which is to be handed over to an image different from an image processing target subjected to the first image processing or the second image processing, to the different image, in a case in which the first image processing or the second image processing includes the handover individual processing operation; and
causing a setting unit to set the common processing operation,
wherein in a case in which the handover individual processing operation is the same as the common processing operation set by the setting unit and is a common processing operation that is not received, the handover unit does not hand over the handover individual processing operation to the different image.

* * * * *